(12) United States Patent
Hamilton et al.

(10) Patent No.: US 7,184,918 B2
(45) Date of Patent: Feb. 27, 2007

(54) AUTOMATED SYSTEM AND METHOD FOR CONDUCTING USABILITY TESTING

(75) Inventors: William Hamilton, Williamston, MI (US); Donald Allen Dalton, Howell, MI (US); Dean Craven, East Lansing, MI (US)

(73) Assignee: TechSmith Corporation, Okemos, MI (US)

( * ) Notice: Subject to any disclaimer, the term of this patent is extended or adjusted under 35 U.S.C. 154(b) by 0 days.

(21) Appl. No.: 11/095,259

(22) Filed: Mar. 31, 2005

(65) Prior Publication Data

US 2005/0254775 A1 Nov. 17, 2005

(51) Int. Cl.
G06F 19/00 (2006.01)

(52) U.S. Cl. .............. 702/120; 702/121; 702/122; 702/123; 702/176; 702/178; 702/182; 702/186; 702/187; 715/719

(58) Field of Classification Search ........ 702/120–122, 702/176, 178, 182, 186–7; 715/719, 704, 715/762; 717/126

See application file for complete search history.

(56) References Cited

U.S. PATENT DOCUMENTS

| | | | |
|---|---|---|---|
| 4,845,665 A | 7/1989 | Heath et al. | |
| 5,086,393 A | 2/1992 | Kerr et al. | |
| 5,220,658 A * | 6/1993 | Kerr et al. | ............ 703/22 |
| 5,724,262 A | 3/1998 | Ghahramani | |
| 5,808,908 A | 9/1998 | Ghahramani | |
| 6,237,138 B1 * | 5/2001 | Hameluck et al. | ...... 717/128 |
| 6,526,526 B1 | 2/2003 | Dong et al. | |
| 2001/0049084 A1 | 12/2001 | Mitry | |
| 2002/0194053 A1 | 12/2002 | Barrett et al. | |
| 2002/0196277 A1 | 12/2002 | Bushey et al. | |
| 2003/0046057 A1 | 3/2003 | Okunishi et al. | |
| 2005/0010808 A1 * | 1/2005 | Wixson et al. | ........... 713/200 |

* cited by examiner

Primary Examiner—Marc S. Hoff
Assistant Examiner—Phuong Huynh
(74) Attorney, Agent, or Firm—Knechtel, Demeur & Samlan

(57) ABSTRACT

An automated system and method for conducting a usability test. The system conducts the usability test and records events that occur on the computer screen in sync with both the video and audio of the user and creates a complete chronicle of events that occur behind the scenes in the applications and the operating system. The system, depending upon the settings specified in the configuration, also captures other input streams and then saves the complete recording of the usability test, along with all the desired events and captures, in a file format. The system allows a remote viewer to observe, in real time, the recording of the usability test and to set markers at critical moments during the recording which are to be recorded. The system also allows the manager or administrator to configure the preferences, import and analyze the usability test and recording files, and prepare presentation videos of the usability test based upon the analyzed criteria.

71 Claims, 33 Drawing Sheets

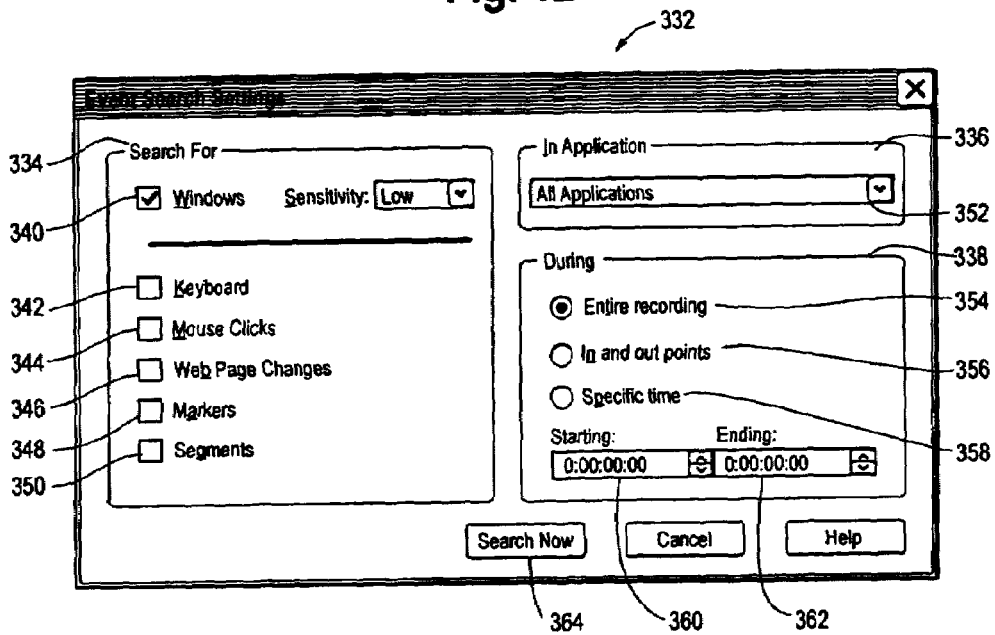

Fig. 13

| △ Elapsed Time | Event | Title | Description | Application | Time/Date |
|---|---|---|---|---|---|
| 00:00:03.400 | Window | Snaglt | Snaglt | Snaglt32.exe | 11:30:52 / Jan 30, 2004 |
| 00:00:03.400 | Window | | Snaglt | Snaglt32.exe | 11:30:52 / Jan 30, 2004 |
| 00:00:03.400 | Window | | Snaglt | Snaglt32.exe | 11:30:52 / Jan 30, 2004 |
| 00:00:03.400 | Window | Snaglt | Snaglt | Snaglt32.exe | 11:30:52 / Jan 30, 2004 |
| 00:00:03.400 | Window | Snaglt | Snaglt | Snaglt32.exe | 11:30:52 / Jan 30, 2004 |
| 00:00:04.600 | Window | &Yes | Switch Capt... | Snaglt32.exe | 11:50:52 / Jan 30, 2004 |
| 00:00:07.200 | Window | Switch Capture Tool | Switch Capt... | Snaglt32.exe | 12:34:12 / Jan 30, 2004 |
| 00:00:07.200 | Window | Snaglt | Snaglt | Snaglt32.exe | 12:34:12 / Jan 30, 2004 |
| 00:00:07.200 | Window | | Snaglt | Snaglt32.exe | 12:34:12 / Jan 30, 2004 |
| 00:00:07.200 | Window | &Close | Snaglt Tip | Snaglt32.exe | 12:37:32 / Jan 30, 2004 |
| 00:00:12.400 | Window | | | Snaglt32.exe | 14:00:52 / Jan 30, 2004 |
| 00:00:12.400 | Window | Snaglt | Snaglt | Snaglt32.exe | 14:00:52 / Jan 30, 2004 |
| 00:00:12.400 | Window | | Snaglt | Snaglt32.exe | 14:00:52 / Jan 30, 2004 |
| 00:00:15.800 | Window | | Snaglt Editor - | Snaglt32.exe | 14:57:32 / Jan 30, 2004 |

Search...
View
Details
Set Time Duration: 0:00:00.000
Number of Events:
Total: 29
Selected: 1

Events

372

Fig. 16
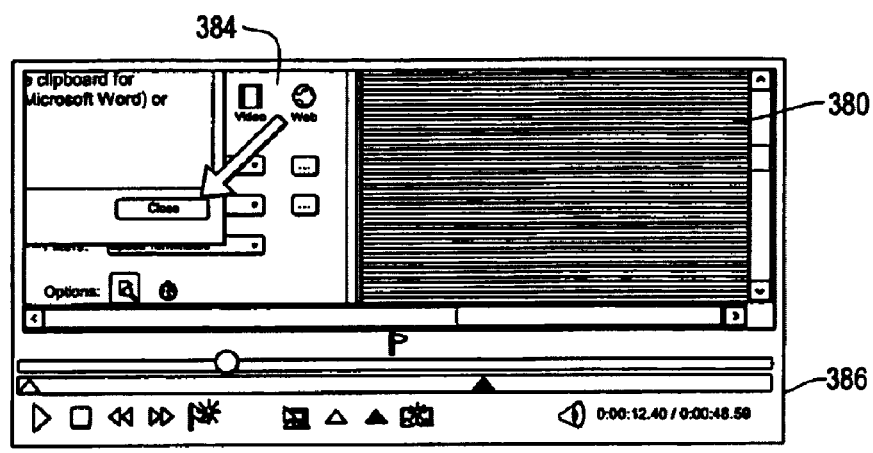
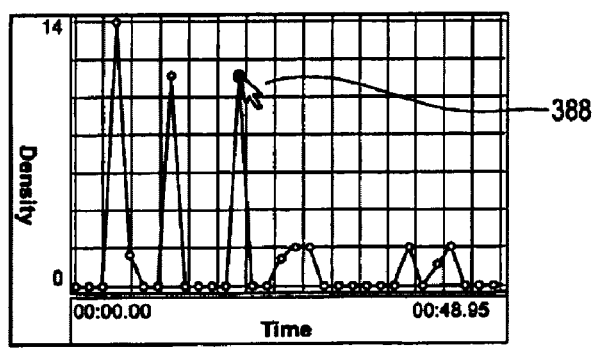

AUTOMATED SYSTEM AND METHOD FOR CONDUCTING USABILITY TESTING

I. FIELD OF THE INVENTION

The present invention relates to usability testing and, more particularly, to a unique automated system and method for conducting usability testing for products.

II. DESCRIPTION OF THE PRIOR ART

Currently, there is no standard for usability professionals to conduct usability testing and, thereby, permit them to produce a product that is more productive, efficient, and/or user friendly. For example, the professional may desire to conduct a usability test on say a certain feature or aspect of a windows application, a software program, a web site design, and/or create a training video and documentation, etc. . . . Although the procedures for conducting the test on these products may vary from one professional to another, a key aspect of the test is to understand what a user does and does not do relating to that feature or aspect of the product. A common testing scenario is as follows:

The professional (which will now be referred to as the tester) obtains 4–8 test subjects or users to test the usability of the product. The users are then asked to perform certain tasks related to, for example, the windows application, the web site, the software program, etc. . . . During this process, the tester observes the users and takes notes on a laptop or pad of paper about the performance of the users and the issues that arise. In some instances, the tester also utilizes video equipment to record the facial expressions and audio of the users. Upon completion, the testers compile highlight videos to provide their developers and engineers with supporting evidence of what issues exist with the program or why users do certain actions. Typically, summary and detailed reports of these tests are also prepared and statistical analysis, graphs, charts, and other data is produced.

While these usability tests are useful tools to the professionals, the manner in which they are conducted and information gathered, stored, searched, and retrieved is archaic and dependent upon manual interaction. The human testers must record their observations manually. This may or may not result in lost information or relevant information not being recorded or unobserved while the tester was taking notes. Also, if video equipment is used, this may provide information on the facial expressions and audio of the users, but without knowing where within the windows application or program, web site, or software program that the user was (since this information can only be obtained from the tester independent from the video and audio), the tester will not know exactly what generated that particular facial expression or audio from the user.

The Applicant, however, has solved this problem by creating an automated system and method for conducting usability testing using a software program designed to record the computer activity and audio and video of the user. Specifically, the software program is configured to record one or more corresponding computer input streams generated by the user. The input streams include but are not limited to: (a) the video of the computer screen, (b) the camera video of the user from the computer, (c) the text on the computer screen and keyboard text of any keystroke typed by the user, (d) audio from the user, (e) system events such as: what application is active, what dialog or window is active, what buttons or menu items are selected by the user, (f) mouse clicks, and (g) web page changes. These input streams are recorded by the program and indexed into searchable files of recorded segments. The tester can then prepare a search of the indexed recorded segments, generate visual outputs of these searches, and analyze the computer activity.

The invention, at least, provides three main advances: (1) the program can capture all available and corresponding computer activity, audio, and video input streams (i.e., (a) through (g) above). The totality of this information may also create large collections of computer system activity that occur over long durations such as days or months; (2) the program can automatically synchronize together all of the computer activity, audio, and video input streams (i.e., (a) through (g) above); (3) the program automatically indexes the recorded information. The recorded information is specifically identified by the context or meaning of the segment recorded. For example, the recorded information may be identified by the particular application used, the active dialog, or by the particular button selected by the user; and (4) the program provides a visual record of all the events by displaying a full screen multimedia video of any selected computer activity or recorded segments.

The following identified patents, listed below by issuance order, were revealed relative to the usability of products.

| Inventor | Issued | Title of Patent | U.S. Pat. No. |
| --- | --- | --- | --- |
| Okunishi | Mar. 06, 2003 | Learning Support System | U.S. Pat. No. 2003/0046057 |
| Dong | Feb. 25, 2003 | Method, System And Program For Performing Remote Usability Testing | 6,526,526 |
| Bushey | Dec. 26, 2002 | Method And System For Automating Creation Of Customer-Centric Interfaces | U.S. Pat. No. 2002/0196277 |
| Barrett | Dec. 19, 2002 | Business Engagement Method | U.S. Pat. No. 2002/0194053 |
| Mitry | Dec. 06, 2001 | Interactive Rewards-Based Pedagogical System Using An Engine of Artificial Intelligence | U.S. Pat. No. 2001/0049084 |
| Hameluck | May 22, 2001 | Buffered Screen Capturing Software Software Tool For Usability Testing of Computer Applications | 6,237,138 |
| Ghahramani | Sep. 15, 1998 | Method For Measuring The Usability of A System | 5,808,908 |

-continued

| Inventor | Issued | Title of Patent | U.S. Pat. No. |
|---|---|---|---|
| Ghahramani | Mar. 03, 1998 | Method For Measuring The Usability of A System And For Task Analysis And Re-Engineering | 5,724,262 |
| Kerr | Jun. 15, 1993 | System For Testing A Performance Of User Interactive-Commands Using An Emulator-Overlay For Determining The Progress Of The User Timing Response | 5,220,658 |
| Kerr | Feb. 04, 1992 | System For Testing Human Factors And Performance Of A System Program | 5,086,393 |
| Heath | Jul. 04, 1989 | Simulation Of Computer Program External Interfaces | 4,845,665 |

Each of the prior art patents uncovered reveals a method or system relating to usability testing or analysis. However, each of the devices in the prior art patents disclose a method or system that is very limited in its application and different than Applicant's invention.

For example, the search revealed a number of patents disclosing methods for testing the usability of products. U.S. Pat. No. 6,526,526 entitled "Method, System And Program For Performing Remote Usability Testing" discloses a method, system and program for performing remote automated usability testing of a software application utilizing a data processing system connected with a network. A user is provided with an automated usability test for a particular software application. The user is prompted to perform particular tasks in response to activation of the automated usability test. Data indicating the usability of the software application is gathered through: (1) user responses to the displayed promptings, and (2) information indirectly gathered such as time it takes a user to perform a particular task requested. The data is then compiled and automatically sent to a data collection location at a remote site within the network such that usability test data from multiple data processing systems in multiple remote user environments is gathered at a location remote from the multiple data processing systems.

Likewise, U.S. Pat. No. 5,220,658 entitled "System For Testing A Performance of User Interactive-Commands Using An Emulator Overlay For Determining The Progress of The User Timing Response" and U.S. Pat. No. 5,086,393 entitled "System For Testing Human Factors And Performance of A System Program" disclose a system for testing certain attributes (i.e., performance and usability) of an interactive system program. The system is capable of capturing human factors data including screen images and associated keystrokes entered during a user session, measuring time intervals between the screen images and keystrokes, and providing such data to a system analyst to determine usability of host computer resident software. The system further provides memory devices to store the human factors of a user session to compare previous sessions and utilizes an emulator overlay to compare previous sessions and determine the user's performance of the system.

In the above patents, the usability methods only disclose recording or storing screen text and keyboard responses which are then utilized to complete their usability testing. None of these patents disclose, teach, or suggest for example Applicant's recording of multiple computer input streams generated by the user and to create a visual record of all these events such that the program developer may review a full screen multimedia video to conduct their usability analysis.

One of the patents revealed in the search disclosed a real time video recording for all ongoing activity that appears on a computer monitor. U.S. Pat. No. 6,237,138 entitled "Buffered Screen Capturing Software Tool For Usability Testing of Computer Applications" discloses a software usability tool that functions as a real-time video recorder for all ongoing activity that appears on a computer monitor. While the software is running on the computer system along with any one or more applications being evaluated, when the user launches the recorder, the software continually records the ongoing screen activity of the application in which the end user is working (i.e., critical event). This critical event is saved to a file and can be replayed at a later time for review. The software tool provides a Browser application which allows all the critical events to be listed and reviewed by the expert. While this patent discloses recording all the ongoing activity on the computer monitor which presumably includes screen and keyboard text and certain system events, it does not appear to disclose, teach, or suggest that other input streams such as the video of the screen, a camera video of the user, and any audio can be recorded and stored simultaneously with the other recorded ongoing activity. This patent also does not disclose or teach that a full screen multimedia video of the computer activity may be displayed or viewed by the program developer as in Applicant's invention.

U.S. Pat. No. 5,808,908 entitled "Method For Measuring The Usability of A System" and U.S. Pat. No. 5,724,262 entitled "Method For Measuring The Usability of A System And For Task Analysis and Re-Engineering" disclose a method for quantitatively and objectively measuring the usability of a system using three methods:(1) usability satisfaction,(2) usability performance, and (3) usability performance indicators. Usability satisfaction is measured by acquiring data from a system user population with respect to a set of critical factors that are identified for the system. Usability performance is measured by acquiring data for quantifying the statistical significance between an expert and a novice to perform specific tasks. Usability performance indicators include goal achievement indicators, work rate usability indicators, and operability indicators which are calculated according to measurable parameters such as performance times, problems encountered, actions taken, calls for assistance, unsolved problems. This patent is directed to the quantitative comparison of data from the usability testing rather than the automatic and simultaneous accumulation of input streams resulting from the computer activity of a user during usability testing.

U.S. Pat. No. 4,845,665 entitled "Simulation of Computer Program External Interfaces" discloses a method for developing computer program external interfaces by simulating the interfaces to allow intended users to evaluate the design of the program before the program code for the simulated program is created. The interfaces are executed as a simulated program which can be altered during execution. The purpose of this patent is to enable a user or program developer to simulate the operation of a computer program without program code and then ask representative users to execute the simulated program by performing typical tasks and noting the users' reactions to the interfaces and task flow. While this program is useful for typical usability testing, it does not disclose, teach, or suggest the recording of various inputs and availability of outputs of Applicant's invention for usability testing.

U.S. Patent Application US2003/0046057 entitled "Learning Support System"; U.S. Patent Application US2002/0196277 entitled "Method And System For Automating The Creation of Customer-Centric Interfaces"; U.S. Patent Application US2002/0194953 entitled "Business Engagement Method"; and U.S. Patent Application US2001/0049084 entitled "Interactive Rewards Based Pedagogical System Using An Engine of Artificial Intelligence" are not usability type devices and, therefore, do not disclose or teach your invention.

Also, while each of the above patents appear to disclose certain recording of various inputs from the computer activity generated by the user during the usability testing, none of the patents however disclose, teach, or suggest recording the audio information simultaneously with the other inputs or the full screen multimedia video created by Applicant's input streams.

Thus, there is a need, therefore, and there has never been disclosed Applicant's unique automated system and method for conducting usability testing.

III. SUMMARY OF THE INVENTION

The present invention is an automated system and method for conducting a usability test. The system conducts the usability test and records events that occur on the computer screen in sync with both the video and audio of the user and creates a complete chronicle of events that occur behind the scenes in the applications and the operating system. The system, depending upon the settings specified in the configuration, also captures other input streams and then saves the complete recording of the usability test, along with all the desired events and captures, in a file format. The system allows a remote viewer to observe, in real time, the recording of the usability test and to set markers at critical moments during the recording which are to be recorded. The system also allows the manager or administrator to configure the preferences, import and analyze the usability test and recording files, and prepare presentation videos of the usability test based upon the analyzed criteria.

IV. BRIEF DESCRIPTION OF THE DRAWINGS

The Description of the Preferred Embodiment will be better understood with reference to the following figures:

FIG. 11 is an enlarged diagram of the search pane of the Manager interface screen.

FIG. 12 is a diagram of the event search settings dialog box of the search pane of the Analyzer tab of the Manager interface screen.

FIG. 13 is a diagram of the list display of the results from the search pane of the Analyzer tab of the Manager interface screen.

FIG. 16 is a diagram of the player window screen of the graph display results from the search pane of the Analyzer tab of the Manager interface screen.

V. DETAILED DESCRIPTION OF THE PREFERRED EMBODIMENT

Figure 1:
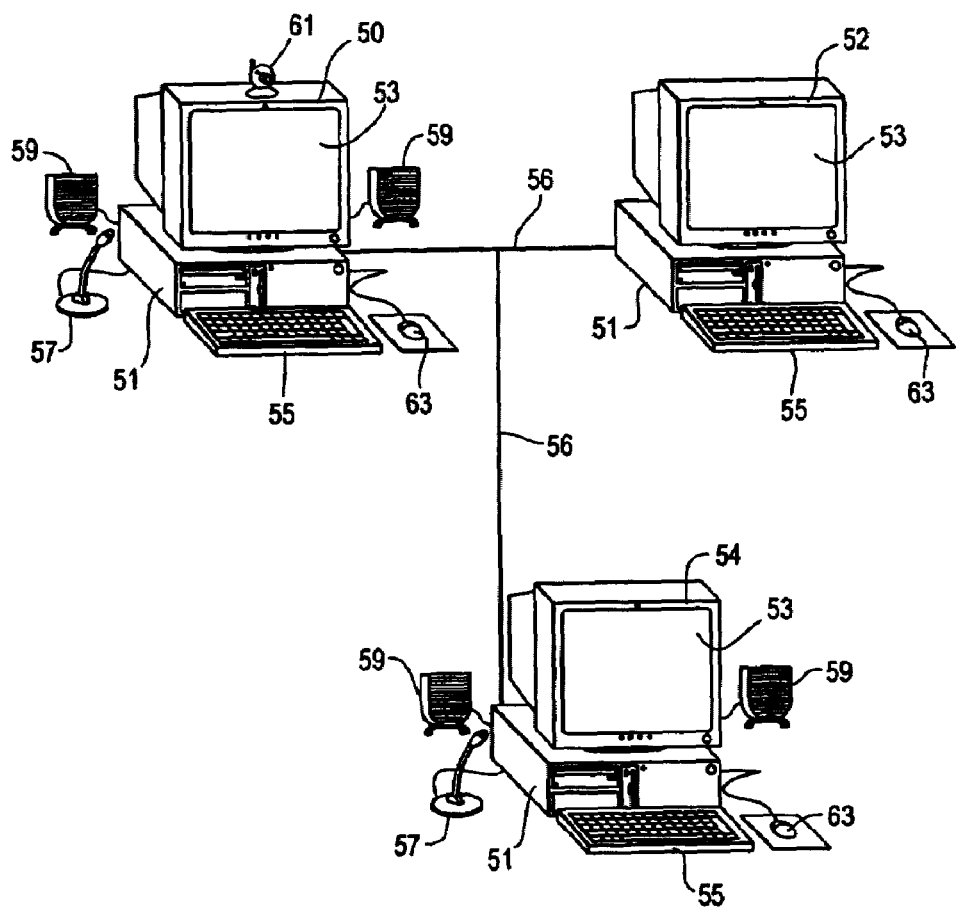
FIG. 1 is a diagram illustrating the computer hardware used in Applicant's system.
Figure 2:
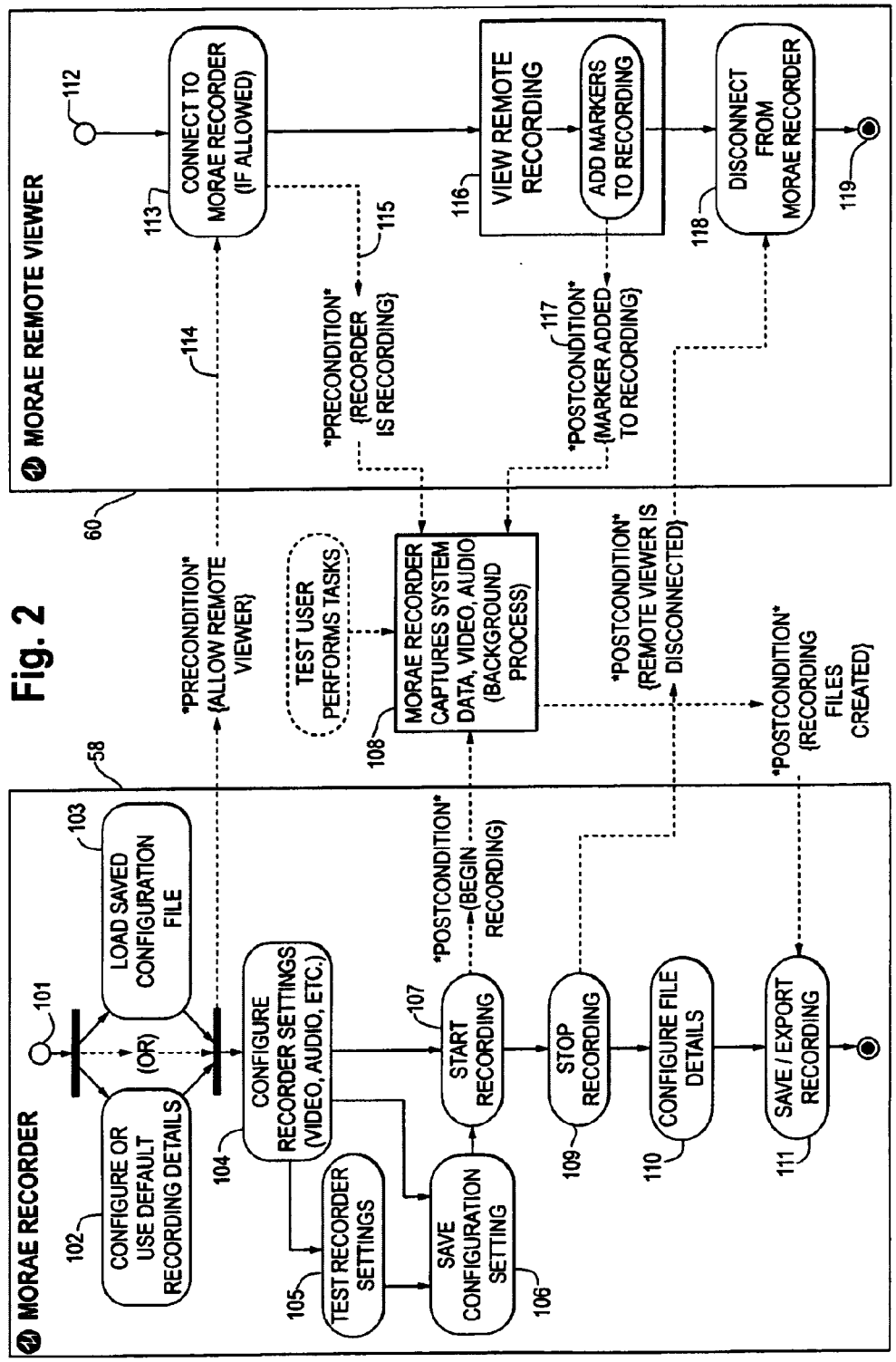
FIG. 2 is a flowchart illustrating the basic operation of Applicant's computer software system for the Recorder and the Remote viewer.
Figure 3:
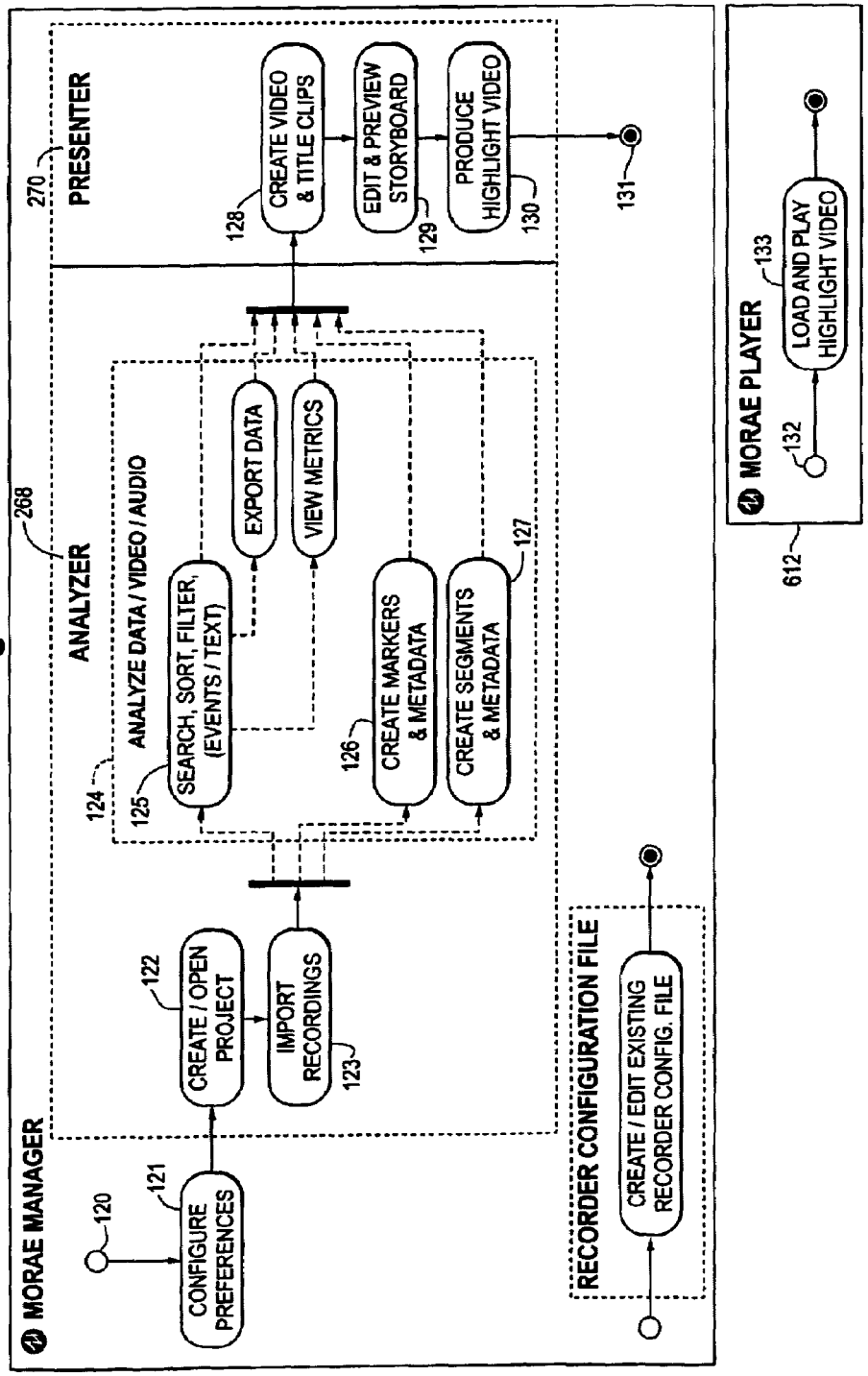
FIG. 3 is a flowchart illustrating the basic operation of Applicant's computer software system for the Manager and Player.

Applicant's invention consists of the interaction between the computer hardware, as illustrated in FIG. 1, and the computer software system, as illustrated in FIGS. 2 and 3. Throughout this patent application, usability test shall be defined as the type of test that is conducted and described in the Description of the Prior Art section above.

Turning to FIG. 1, the computer hardware consists of a recorder source or user computer 50, a remote viewer computer 52, and a project manager computer 54, with each connected to one another over a network connection 56 such as a local area network (LAN) or a wide area network (WAN). Alternatively, the project manager computer 54 does not need to be connected to the network, if desired. The recorder source or user computer 50 consists of a central processing unit 51, a computer screen 53, a keyboard 55, a mouse 63, a microphone 57, speakers 59, and a camera 61. The remote viewer computer 52 and the project manager computer 54 each likewise consist of the same central processing unit 51, the computer screen 53, the keyboard 55, and the mouse 63. The project manager computer 54 also consists of the same microphone 57 and speakers 59. Computers and their components are well known in the art and it is contemplated that any compatible type, version, or size made by any manufacturer is acceptable to accomplish the intended purposes of Applicant's invention.

Preferably, to install and run the computer software on this computer hardware, the recorder source or user computer 50 and the project manager computer 54 should provide Microsoft Windows 2000 or XP, Microsoft DirectX 8.1 (9.0 or higher recommended), 1 gigahertz processor (2 GHz recommended), 128 megabytes of read access memory (512 MB recommended), 64 megabyte video card (128 megabytes recommended), windows-compatible sound card, microphone 57 and speakers 59, and 20 megabytes of available hard disk space for installation. The recorder source or user computer 50 should also be provided with a USB camera 61 and, if using remote viewer discussed infra, a networked computer with 10 Mbps connection (100 Mbps recommended). The remote viewer computer 52 should provide Microsoft Windows 2000 or XP, 800 megahertz processor (1 GHz processor recommended), 128 megabytes of read access memory, networked computer with 10 Mbps connection (100 Mbps recommended), and a 5 megabyte hard drive space for installation. Alternatively, it is contemplated that the computer software can be modified for use with both Macintosh and Unix based systems.

Turning to FIG. 2, there is illustrated a schematic diagram of the basic operation of a unique automated system and method for conducting usability testing. In the preferred embodiment, the recorder source or user computer 50 uses the recorder computer software 58, the remote viewer computer 52 uses the remote viewer computer software 60, and the project manager computer 54 uses the manager computer software 62 (FIG. 3).

As an overview, the recorder computer software 58 (hereinafter referred to as the "Recorder"), during usability testing, records events on the computer screen in sync with both the video and audio of the user and also creates a complete chronicle of events that occur behind the scenes in the applications and the operating system. The Recorder, depending upon the settings specified in the configuration, also captures multiple input streams and then saves the recording in a file format that can later be imported into a project within the manager computer software 62.

The remote viewer computer software 60 ("hereinafter referred to as the "Remote Viewer") enables a viewer to observe, in real time, the recording of the usability testing (i.e., screen activity) that occurs from the Recorder on the recorder source or user computer 50. The Remote Viewer also enables the viewer to set markers at critical moments during the recording which are recorded by the Recorder.

The manager computer software 62 ("hereinafter referred to as the "Manager") creates configuration files for the Recorder, imports recordings created by the Recorder for analysis and presentation of the results.

In Step 101 of the Recorder, the process for recording a usability test begins or is launched. If the default information relating to the recording needs to be confirmed or changed, proceed to Step 102. If the information relating to the recording is already saved in a particular configuration file and this configuration is desired to be used for the new recording, proceed to Step 103.

Figure 4:
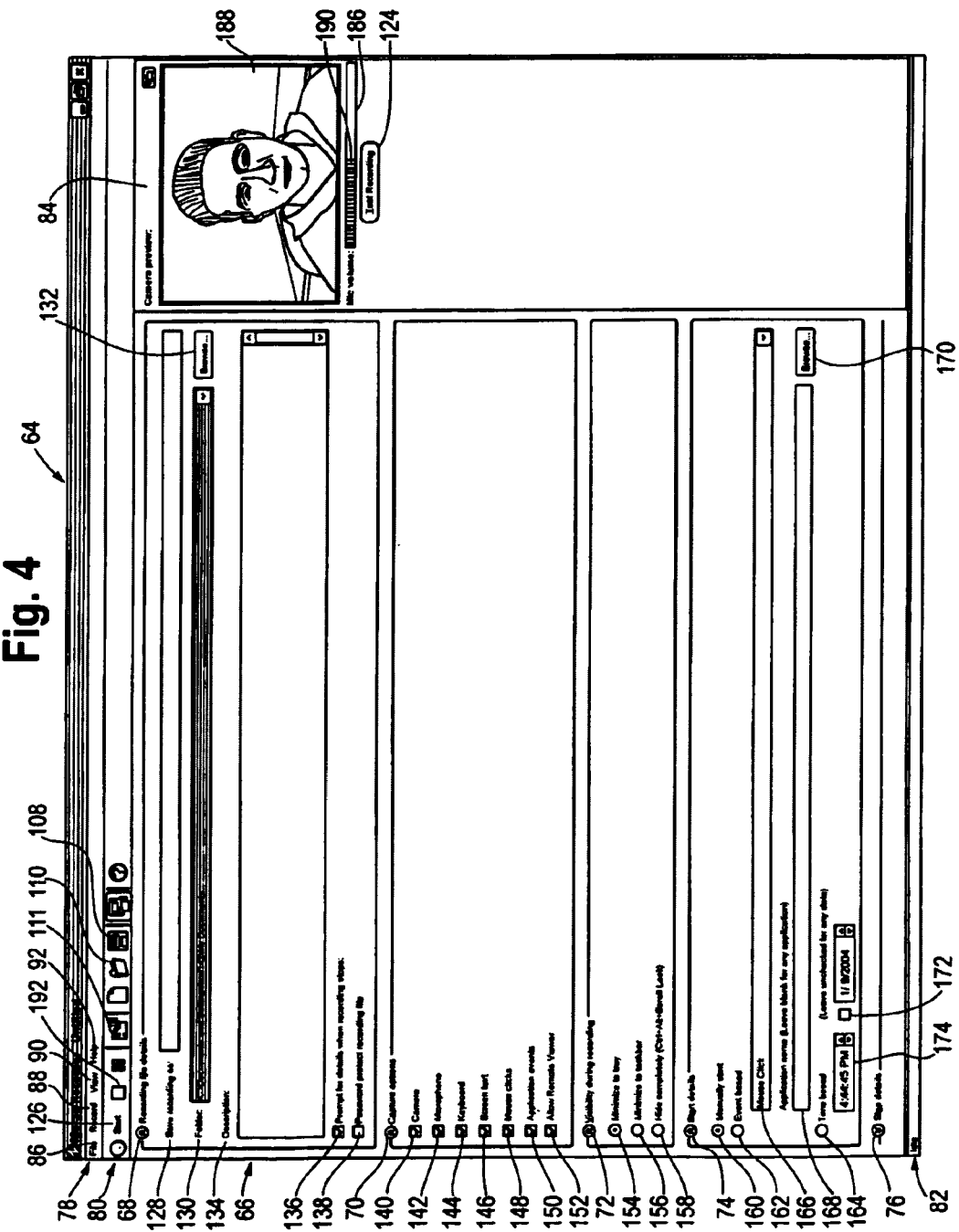
FIG. 4 is a diagram of the Recorder interface screen.

In Step 102, a Recorder interface 64, as illustrated in FIG. 4, displays the recording details for the Recorder. The Recorder interface 64 consists of a Menu Bar 78 which provides access to all of the Recorder's options, a Toolbar 80 which provides Recorder's most commonly used options within easy reach, a Configuration pane 66 which permits the settings of the Recorder to be customized for use during a recording session, a Status Bar 82 which displays helpful information about the status of the Recorder, and a Camera preview pane 84 which displays a preview of the camera video and the appropriate microphone volume level.

The Configuration pane 66 provides five categories of configuration settings for the recording: a recording file details section 68, a capture options section 70, a visibility during recording section 72, a start details section 74, and a stop details section 76.

The recording file details section 68 provides a save recording as option 128 which permits the file name for a recording to be assigned (i.e., recording file), a folder option 130 which permits the designation or selection of the folder to save the recording file, a browse option 132 displays a dialog box showing the directories of folders to designate or select for the folder option 130, a description option 134 which permits a description or other textual data related to a recording that is to be typed and saved with the recording file, a prompt for details when recording stops option 136 which, if the box is checked, provides, upon completion of a recording, a prompt for the recording file details of this recording file details section 68, and a password protect recording file option 138 which, if the box is checked, provides a prompt to enter a password to protect the recording file.

The capture options section 70 provides a camera option 140 which permits the recording of the video of the user from an attached camera 61 during the usability test; a microphone option 142 which permits the recording of the audio data from an attached microphone 57 during the usability test; a keyboard option 144 which permits the recording of the data related to the activity from the keyboard 55 of the recorder source computer 50 as entered by the user during the usability test. This data includes all the numeric and alphabetic keys pressed on the keyboard 55; a screen text option 146 which permits the recording of the text being displayed on the computer screen 53 of the recorder source computer 50. This screen text includes every word shown on the computer screen 53 except for those that are part of an image; a mouse clicks option 148 which permits the recording of the mouse clicks (left and right) occurring from the mouse 63 during the recording of the usability test; an application events option 150 which permits the recording of any and all windows events and web page changes that occur from all applications that are running on the computer during the recording of a usability test. Windows events include but are not limited to opening and closing main application windows, smaller windows appearing within the main window (dialog boxes, alerts, etc.), menus, buttons appearing on dialogs or windows, and other window related objects such as slider bars, list views, edit boxes, etc.; and allow remote viewer option 152 which permits remote viewing of the usability test by the Remote Viewer during the recording session.

The visibility during recording section 72 provides a minimize to tray option 154 which permits the Recorder to be visible as a tray icon on the computer screen 53 of recorder source computer 50 when minimized, a minimize to taskbar option 156 which permits the Recorder to be visible on the taskbar of the recorder source computer 50, and a hide completely option 158 which permits the Recorder to be completely hidden from view on the recorder source computer 50 during the recording of a usability test. If the hide completely option 158 is selected and used during a recording, depressing the hotkey combination of (Ctrl+Alt+Scroll Lock) will make the Recorder visible again.

The start details section 74 provides a manual start option 160 which permits the recording to manually start or begin when the recording is started, as described in further detail below; an event based option 162 which permits the recording to start or begin when a certain event occurs; and a time based option 164 which permits the recording to start or begin at a particular date and time.

With respect to the event based option 162, an event based drop down menu 166 is provided to select the type of event to begin the recording. The type of event to enter in the event based drop down menu 166 that triggers the beginning of the recording includes but is not limited to a mouse click, the launch of a specified application, or the exiting of a specified application. If the recording is to begin upon a particular application executable file, an application name box 168 is provided to enter the particular application executable file (i.e., .exe file). Should the recording begin upon the occurrence of a particular application executable file and the exact name of the application executable file is unknown, an event based browse option 170 is provided to display a list of application executable files to enter into the application name box 168.

With respect to the time based option 164, a date box 172 and a time box 174 are provided to enter the date and time to begin the recording. Preferably, the date box 172 receives dates in the form of (mm/dd/yyyy) and the time box 174 receives the time in the form of (hh:mm:ss; am/pm). If a dates is not provided in the date box 174, the recording will begin during any day that the time entered in the time box 174 occurs.

Figure 4A:
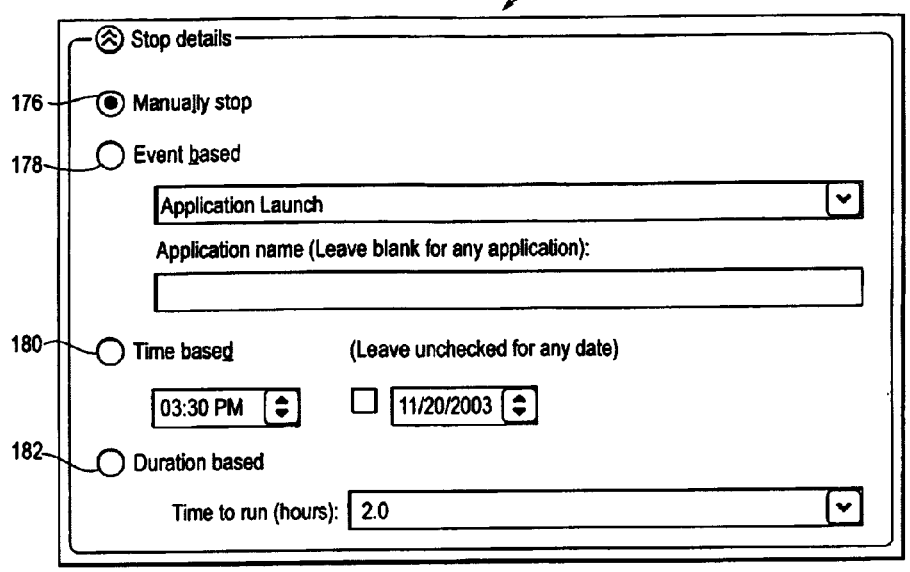
FIG. 4a is a diagram of the stop detail section screen of the Recorder interface.

The stop details section 76, as illustrated in FIG. 4a, provides a manual stop option 176, an event based option 178, a time based option 180, and a duration based option 182. In the preferred embodiment, the manual stop option 176, the event based option 178, and the time based option 180 work in the same manner as the options in the start details section 74 except that the recording session will stop following the occurrence of one of these selected options.

The duration based option 182 permits the recording to stop after a certain amount of time has elapsed. A time to run box 184 within the duration based option 182 is provided to enter the desired length of time. The time entered is in the form of hours.

In this Step 102, all of the recorder interface 64 settings are configured. These include all of the options contained within the recording file details section 68, the capture options section 70, the visibility during recording section 72, the start details section 74, and the stop details section 76. When completed, proceed to Step 104.

In Step 103, a configuration file of previously saved configuration settings may be loaded and used for a new recording. The configuration settings loaded are the same recorder interface 64 settings entered in Step 102. The configuration file may be loaded using either the Menu Bar 78 or the Toolbar 80.

Figure 5:
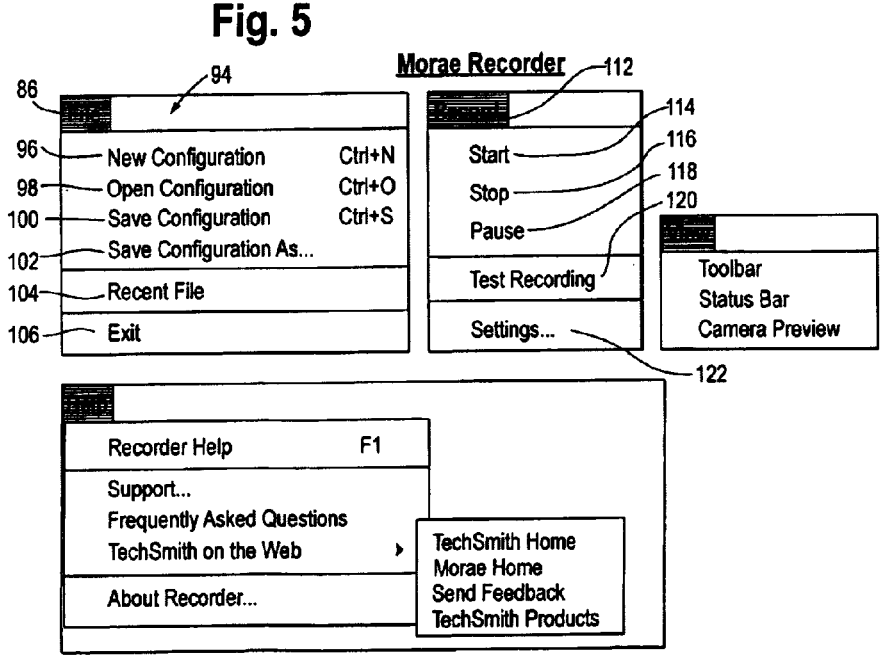
FIG. 5 is a diagram of the Recorder drop down menus from the menu bar of the Recorder interface screen.

The Menu Bar 78 consists of a File heading 86, a Record heading 88, a View heading 90, and a Help heading 92. Using the Menu Bar 78, the File heading 86 is selected which displays a file heading drop down menu 94, as illustrated in FIG. 5. The file heading drop down menu 94 provides selections of a new configuration 96, an open configuration 98, a save configuration 100, a save configuration as 102, a recent file 104, and an exit 106. Selecting open configuration 98 provides access to all of the saved configuration files and permits the desired configuration file to be opened and loaded into the Configuration pane 66 of the Recorder interface 64. This process may also be designated by the nomenclature of "File >Open Configuration". The "File" refers to the File Heading 86 and the "Open Configuration" refers to the open configuration 98.

Alternatively, the configuration settings may be loaded using the Toolbar 80 which provides an open configuration icon 110. Selecting the open configuration icon 110 will also automatically provide access to all of the saved configuration files and permit the desired configuration file to be opened and loaded into the Configuration pane 66 of the Recorder interface 64.

In Step 104, the global settings for the Recorder are set. The global settings are different than the recordings configuration settings configured in Step 102 as the global settings affect every recording created within Recorder regardless of which configuration file is open. The recordings configuration settings configured in Step 102 only affect the single recording with which it is used. The global settings may be configured using either the Menu Bar 78 or the Toolbar 80.

Figure 5A:
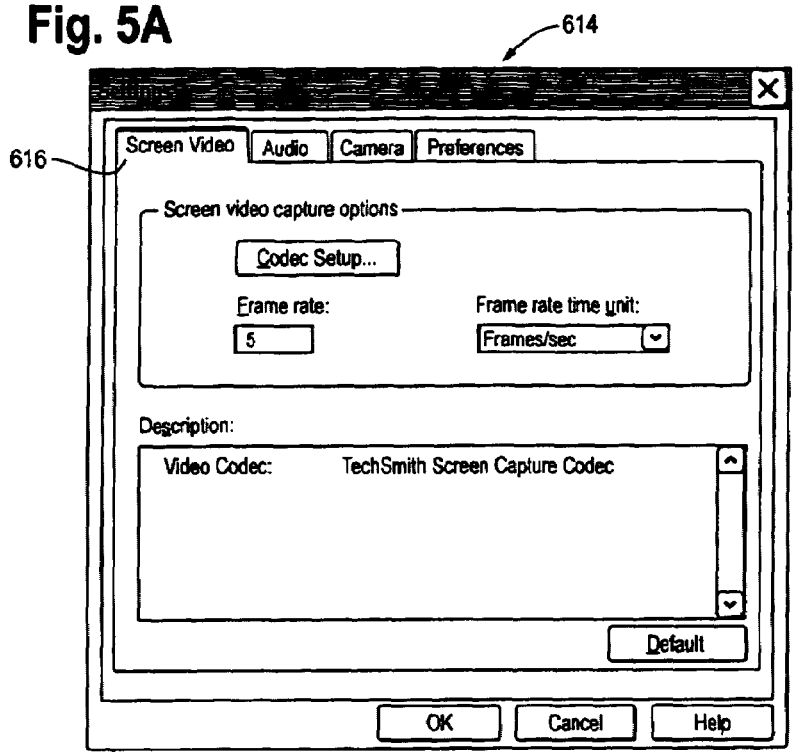
FIG. 5a is a diagram of the screen video option of the settings dialog box from the record heading drop down menu of the Recorder interface screen.
Figure 5B:
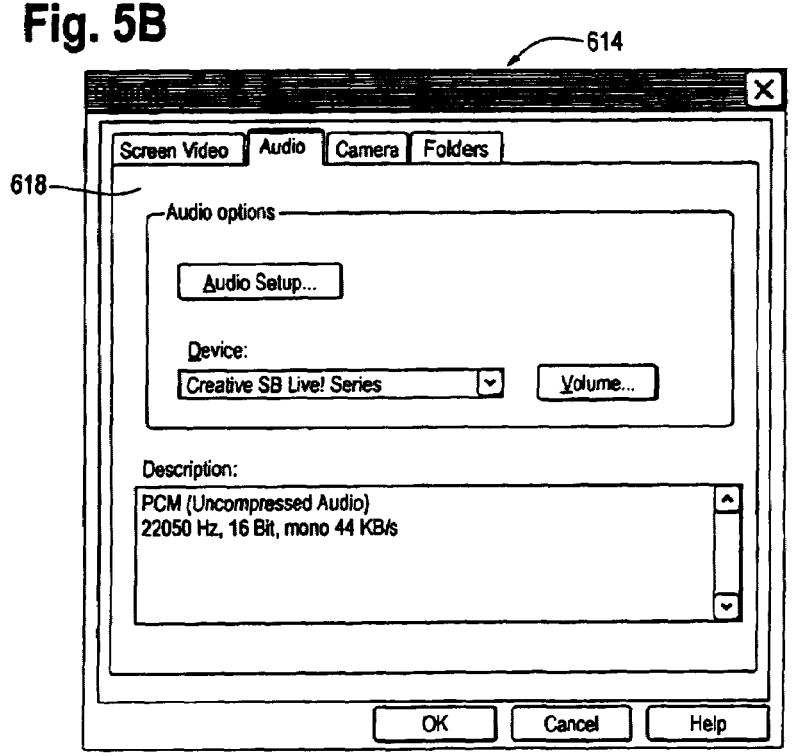
FIG. 5b is a diagram of the audio option of the settings dialog box from the record heading drop down menu of the Recorder interface screen.
Figure 5C:
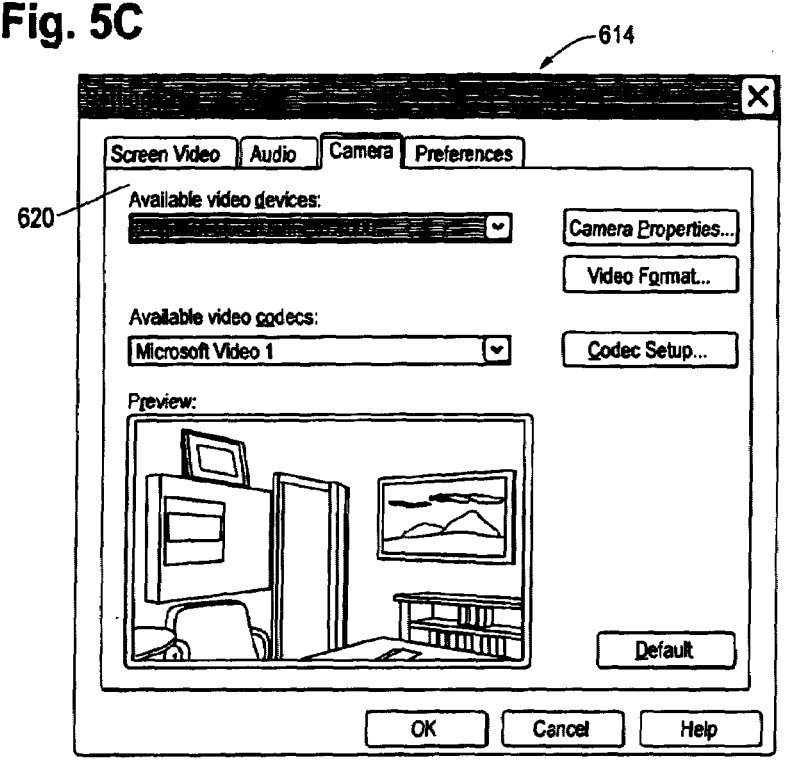
FIG. 5c is a diagram of the camera option of the settings dialog box from the record heading drop down menu of the Recorder interface screen.
Figure 5D:
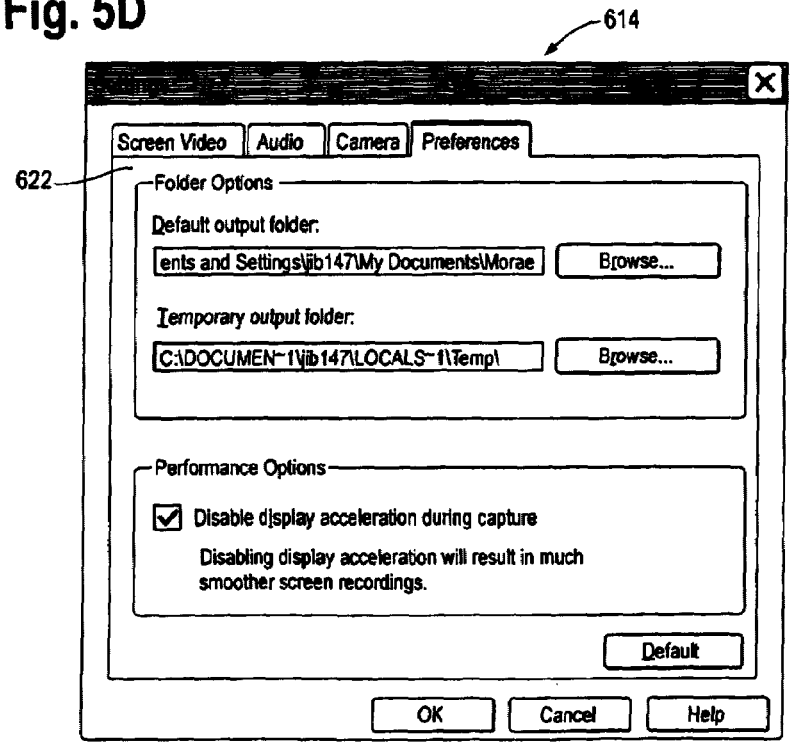
FIG. 5d is a diagram of the preferences option of the settings dialog box from the record heading drop down menu of the Recorder interface screen.

Using the Menu Bar 78, selecting record heading 88 displays the record heading drop down menu 112, as illustrated in FIG. 5. Selecting the settings 122 displays a settings dialog box 614, as illustrated in FIGS. 5a through 5d. The settings dialog box 614 provides a screen video option 616 as illustrated in FIG. 5a, a audio option 618 as illustrated in FIG. 5b, a camera option 620 as illustrated in FIG. 5c, and a preferences option 622 as illustrated in FIG. 5d. This process may also be designated by the nomenclature of "Record >Settings". The "Record" refers to the Record heading 88 and the "Settings" refers to the settings 122.

The settings dialog box 614, as illustrated in FIG. 5a, permits the codec used to compress the screen video and quality options associated with that codec to be set, the frame rate at which the Recorder will record the screen to be set or, in other words, the number of frames to be recorded per unit of time, and the time unit for the frame rate setting to be set.

The audio option 618, as illustrated in FIG. 5b, permits the record and playback rate options to be set, the device to record the audio to be set, and the recording volume level for the input device to be set.

The camera option 620, as illustrated in FIG. 5c, permits the camera to use with the Recorder to be selected, the various aspects of video quality such as brightness, contrast, sharpness, RGB values, etc. to be set, the variables such as frame rate and output size to be adjusted, the video codec to use with the camera to be chosen, the compression quality, key frame rate, and data rate to be configured, and a preview of what the video recording will look like based on the current settings.

The preferences option 622, as illustrated in FIG. 5d, permits the default and temporary output folders for the recordings to be designated, and provides performance options for display acceleration during capture.

Alternatively, the global settings for the Recorder may be set using the Toolbar 80 which provides a recorder settings icon 111. Selecting the recorder settings icon 111 will also automatically provide access to the settings dialog box 614, as illustrated in FIGS. 5a through 5d. For each of the settings dialog box 614 options, select the desired settings. Once all the desired global configuration settings have been entered, if the configuration settings are to be tested, proceed to Step 105. If not, proceed directly to Step 106.

In Step 105, a test recording of the configuration settings chosen may be conducted. In the preferred embodiment, the test recording is a ten (10) second test. During this test, desktop activity and sounds should be created for the Recorder to capture (i.e., speak into the microphone 57 and actively interact with the source computer 50). Any problems encountered during this test will be indicated, thereby, permitting the problems to be resolved prior to the actual recording. Upon completion of the test recording, the screen video and audio data created will automatically playback enabling a review of the selected configuration settings to confirm the appropriate selections for the particular usability test to be conducted. The test recording can be run using either the Menu Bar 78 or the Toolbar 80.

Using the Menu Bar 78, the Record heading 88 is selected which displays a record heading drop down menu 112, as illustrated in FIG. 5. The record heading drop down menu 112 provides selections of start 114, stop 116, pause 118, test recording 120, and settings 122. Selecting test recording 120 will begin the test recording. This process may also be designated by the nomenclature of "Record >Test Recording". The "Record" refers to the Record Heading 88 and the "Test Recording" refers to the test recording 120. Alternatively, the test recording may be started using the Camera preview pane 84 which provides a test recording icon 124. Selecting the test recording icon 124 will also automatically begin the test recording.

Once the test recording begins, the Camera preview pane 84 will display a message in the status message area 186 that will read "Recording in progress" and the Status Bar 82 will confirm that the recording is being made. During the test recording, the user should create desktop activity and sound for the Recorder to capture. This includes but is not limited to actively interacting with the recorder source computer 50 and/or speaking into the microphone 57. At the end of the test recording, the camera preview area 188 will display what the camera 61 is recording. If the camera 61 is not positioned properly, this camera preview area 188 can be used to accurately adjust the position of the camera 61. A mic volume indicator bar 190 gives an accurate visual indication of the level of sound coming in from the attached microphone 57. The player computer software (hereinafter referred to as "Player" and, discussed in further detail below, will also launch and playback the screen video, audio, and show the camera picture in picture image from the test recording. When finished viewing the test recording and satisfied with the configuration settings, close the Player manually and proceed to Step 106.

In Step 106, upon completion of entering and testing the configuration settings, the configuration settings are then saved using either the Menu Bar 78 or the Toolbar 80.

Using the Menu Bar 78, the File heading 86 is selected which displays the file heading drop down menu 94. Selecting save configuration 100 saves the configuration settings in the name and location provided in the Recording file details section 68, if desired, or under the same configuration file currently opened. This process may also be designated by the nomenclature of "File >Save Configuration". The "File" refers to the File heading 86 and the "Save Configuration" refers to the save configuration 100. Alternatively, selecting the save configuration as 102 will allow the currently entered file name and location provided in the Recording file details section 68 to be changed to a different file name and location, as desired. This process is designated by the nomenclature of "File >Save Configuration As". The "File" refers to the File heading 86 and the "Save Configuration As" refers to the save configuration as 102.

If the file heading drop down menu 94 was selected inadvertently or by mistake, selecting exit 106 will cancel the file heading drop down menu 94 and exit unchanged from the Recorder application.

Alternatively, the configuration settings may be saved using the Toolbar 80 which provides a save configuration icon 108. Selecting the save configuration icon 108 will also automatically save the configuration settings in the name and location provided in the Recording file details section 68. Once the configuration settings have been configured and saved, proceed to Step 107.

In Step 107, the recording begins. The recorder is started using either the Menu Bar 78 or the Toolbar 80. Using the Menu Bar 78, the Record heading 88 is selected which displays the record heading drop down menu 112. Selecting start 114 starts or begins the recording. This process may also be designated by the nomenclature of "Record >Start". The "Record" refers to the Record heading 88 and the "Start" refers to the start 114.

Alternatively, the recording may be started using the Toolbar 80 which provides a Start icon 126. Selecting the Start icon 126 will also automatically start or begin the recording. Once the recording begins, proceed to Step 108 where the user performs the usability test.

In Step 108, if the manual start option 160 in the start details section 74 is selected, the Recorder will begin recording all the input streams of the usability test discussed below. If the event based option 162 is selected, the recording will not begin until the specified event occurs such as the event selected in the event based drop down menu 166 or the application named in the application name box 168. If the time based option 164 is selected, the recording will not begin until either the date in the date box 172 and/or the time in the time box 174 or both occur.

In the preferred embodiment and during the usability test, the recording will record all the information using the configuration settings selected in the Configuration pane 66 of the Recorder interface 64. In the capture option section 70, if the camera option 140 is selected, the camera 61 will record the video of the user as the user appears during the usability test. If the microphone option 142 is selected, the microphone 57 will record the audio from the user during the usability test. If the keyboard option 144 is selected, any keystroke typed on the keyboard 55 by the user during the usability test is recorded such as text, enter key, shift key, function key, etc. . . . If the screen text option 146 is selected, the text displayed on the computer screen 53 during the usability test is recorded. If the mouse clicks option 148 is selected, the left and right clicks of the mouse 63 by the user will be recorded during the usability test. If the application events option 150 is selected, each of the application events that occur during the usability test will be recorded. Application events include but are not limited to what application is active, what dialog or window is active, what buttons or menu items are selected by the user. Also, during each recording or usability test, the video of the computer screen is always recorded or captured regardless of the other options selected. The video of the computer screen is a video file and the other information captured are data files. Reference to a particular data file corresponds to and can be viewed in the context of the video file. The data file input streams are synchronized in time with the video stream of the video file. This is discussed in further detail in the Manager. Each of these capture options are collectively referred to as "input streams".

When the usability test is completed, proceed to Step 109 to stop the recording. In Step 109, the recorder is stopped using either the Menu Bar 78 or the Toolbar 80. Using the Menu Bar 78, the Record heading 88 is selected which displays the record heading drop down menu 112. Selecting stop 116 stops the recording. This process may also be designated by the nomenclature of "Record >Stop". The "Record" refers to the Record heading 88 and the "Stop" refers to the stop 116.

Alternatively, the recording may be stopped using the Toolbar 80 which provides a Stop icon 192. Selecting the Stop icon 192 will also automatically stop the recording.

If the manual stop option 176 in the capture options section 70 is selected, the Recorder will stop the recording of the usability test. If the event based option 178 is selected, the recording will not stop until the specified event occurs. If the time based option 180 is selected, the recording will not stop until either the date and/or the time or both occur. If the time to run box 184 is selected, the recording will not stop until the time duration occurs. Alternatively, despite any selection made above, the stop icon 192 will always stop the recording. When the recording stops, proceed to Step 110.

In Step 110, if the prompt for details when recording stops option 136 is selected in Step 102, the recording file details section 68 will again be displayed such that the save recording as option 128, the folder option 130, and the description option 132 can be entered at this time. When finished configuring the file details, proceed to Step 111.

In Step 111, the recording files saved (i.e., the recording file saved under the save recording as option 128 of the recording file details section 68) are then exported to the project manager computer 54 for use by the Manager. As the recording files may be quite large, especially if a test is recorded for a long period of time or due to frequent recordings, the recording files may not fit on smaller removable storage disks (such as floppy or zip disks) or may bog down slow network connections. To alleviate this, there are three methods for exporting recording files.

First, if the recorder source computer 50 is connected to a network with the project manager computer 54, or if the two components are installed on the same machine, the recording files may be saved in a directory that is shared by both computers. In this manner, using Manager, the recording files can located and imported directly into Manager. Second, the recording files may be saved temporarily to the hard drive of the recorder source computer 50. In this manner, the recording files may be burned to a compact disc (CD) or digital video discs (DVD) and easily exported to the Manager. Lastly, if the recorder souce computer 50 is connected to a thumb drive or a portable external drive, the recording files may be saved directly to this drive. When the recordings are completed, simply disconnect the drive and reconnect it to the project manager computer 54 and import the recording files directly into Manager from the portable drive.

The following is a basic example of the steps in the Recorder.

A usability researcher is conducting a usability test of an accounting software program. The key goals are to determine how long it takes a user to file a tax return and how many times the user must access the help menu during the process. The researcher wants to record the screen, video and audio of the participant, mouse clicks, keystrokes, and window events.

First, the Recorder is installed and the camera and the microphone are connected to the same computer as the accounting software program. Next, the researcher enters "Participant 1" in the save recording as input box, and specifies a folder on the computer's hard drive as the location for saving the file. In the Recording file details input box, the researcher enters the following information:

"Participant 1—John Doe

Accounting software usability test

Location: New York City"

Since the researcher entered all of the recording file details before the test, she deselects the Prompt for Details When Recording Stops.

Next, the researcher specifies what input streams to capture. She selects camera and microphone in order to capture the participants facial and verbal expressions. Additionally, the researcher selects keystrokes, mouse clicks, and allow Remote Viewer so she can observe the test in real time and enter markers.

For the Visibility During Recording options, the researcher selects minimize to tray.

The researcher would like the recording to begin when the participant launches the accounting software. To do this, the researcher selects Event Based In the Start Details options, and then chooses Application Launch from the drop down list. In the Application Name input box, she types in the name of the accounting program's executable file (i.e. "accounting.exe").

Since the researcher doesn't know how long the test will last, she chooses the Manual option under Stop Details. That way, she can stop the recording by clicking on the stop tool bar button when the test is finished.

Next, the researcher saves the configuration file that includes all of the settings she just specified. With the configuration file saved, she can reuse it with the other participants of the study, so she doesn't have to go through this process each time. Additionally, by using the configuration file with each participant, the researcher knows that each recording will be conducted in the same way.

Now the researcher checks the camera preview in the Recorder and adjusts the camera so it is pointed properly to capture the participants face when they are using the computer. She also checks the microphone volume level in the Mic Volume display under the camera preview window, by talking outloud.

With all the settings and adjustments made, the researcher wants to be sure the Recorder will capture everything properly, so she clicks on the Test Recording button. The Recorder application disappears, and the researcher moves the mouse around, opens an application and talks out loud. After ten seconds, the test recording completes and automatically plays back in the Morae Player. The researcher makes sure the video and audio were recorded properly.

Everything worked perfectly, so the researcher is ready for the first participant. She clicks on the Start button on the Recorder's tool bar to initialize the Recorder. Since she configured Recorder to start when the accounting application launches, the Recorder minimizes to the tray and does not start recording. It is waiting for the start trigger as specified in the configuration settings.

When the participant arrives and launches the accounting software to begin the test, Recorder automatically begins recording based on the capture options specified in the configuration file, which were camera, microphone, keyboard, and mouse clicks. When the participant is done with the test, the researcher manually stops the Recorder by right clicking on its icon in the tray, and selecting Stop from the menu. The Recorder stops recording and automatically saves the recording file with the name "Participant 1" to the location specified in the configuration file.

After all the participants have completed testing, the researcher is now ready to import the recording files into the Manager component and conduct analysis to answer the goals of the study.

During the usability testing in the Recorder, the Remote Viewer may simultaneously be passively or actively involved in the events occurring in the recording on the source computer 50.

Figure 6:
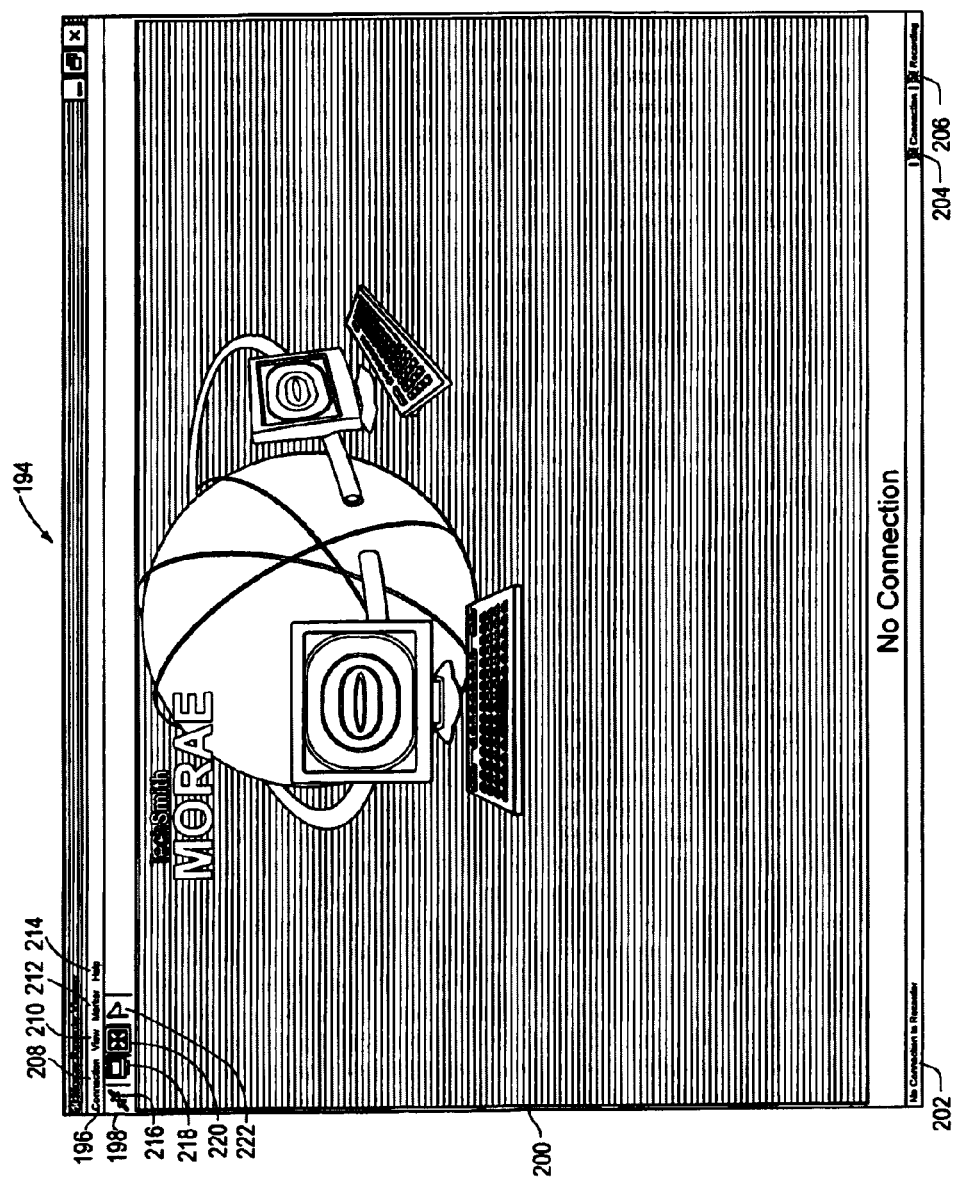
FIG. 6 is a diagram of the Remote viewer interface screen.

Referring to Remote Viewer of FIG. 2, proceed to Step 112. In Step 112, a Remote Viewer interface 194, as illustrated in FIG. 6, displays the details for the Remote Viewer. The Remote Viewer interface 194 consists of a Menu Bar 196 which provides access to all of the Remote Viewer's options, a Toolbar 198 which provides Remote Viewer's most commonly used options within easy reach, a Viewing window 200 which provides a view of the desktop activity occurring on the recorder source or user computer 50 during the usability test in Step 108 of the Recorder, a Status Bar 202 which displays helpful information about the Remote Viewer including but not limited to the status of the connection of the Remote Viewer to the Recorder and the status of the most recent recording session, a Connection Status icon 204 which visually indicates the status of the connection of the Remote Viewer to the Recorder (i.e., if the icon is green, the Remote Viewer is successfully connected to the Recorder), and a Recording Status icon 206 which visually indicates the status of the recording in the Recorder (i.e., if the icon is a crossed-out circle, no recording is in progress).

In Step 113 of the Remote Viewer, for a connection to occur the conditions of Step 114 must be satisfied. Remote Viewer will not display the screen of the recorder source or user computer 50 until Step 115 is satisfied.

In Step 114, if in the Recorder the allow remote viewer option 152 in the capture options section 70 is selected, a viewer may observe, in real time, the recording that occurs on the recorder source or user computer 50 during the usability test in Step 108 of the Recorder. If satisfied, proceed to Step 115. If this option is not selected in the Recorder, proceed to Step 119, as there can be no connection between the computers.

In Step 115, the usability testing or recording must have begun or, in other words, Step 108 has been launched. If so, continue to proceed with Step 113. If a usability test or recording is not launched, proceed to Step 119, as there is no recording to view or reason to connect the computers.

With the preconditions of Steps 114 and 115 satisfied, Step 113 is continued. The remote viewer computer 52 and the Remote Viewer may be connected to the recorder source computer 50 and the Recorder using either the Menu Bar 196 or the Toolbar 198.

Figure 7:
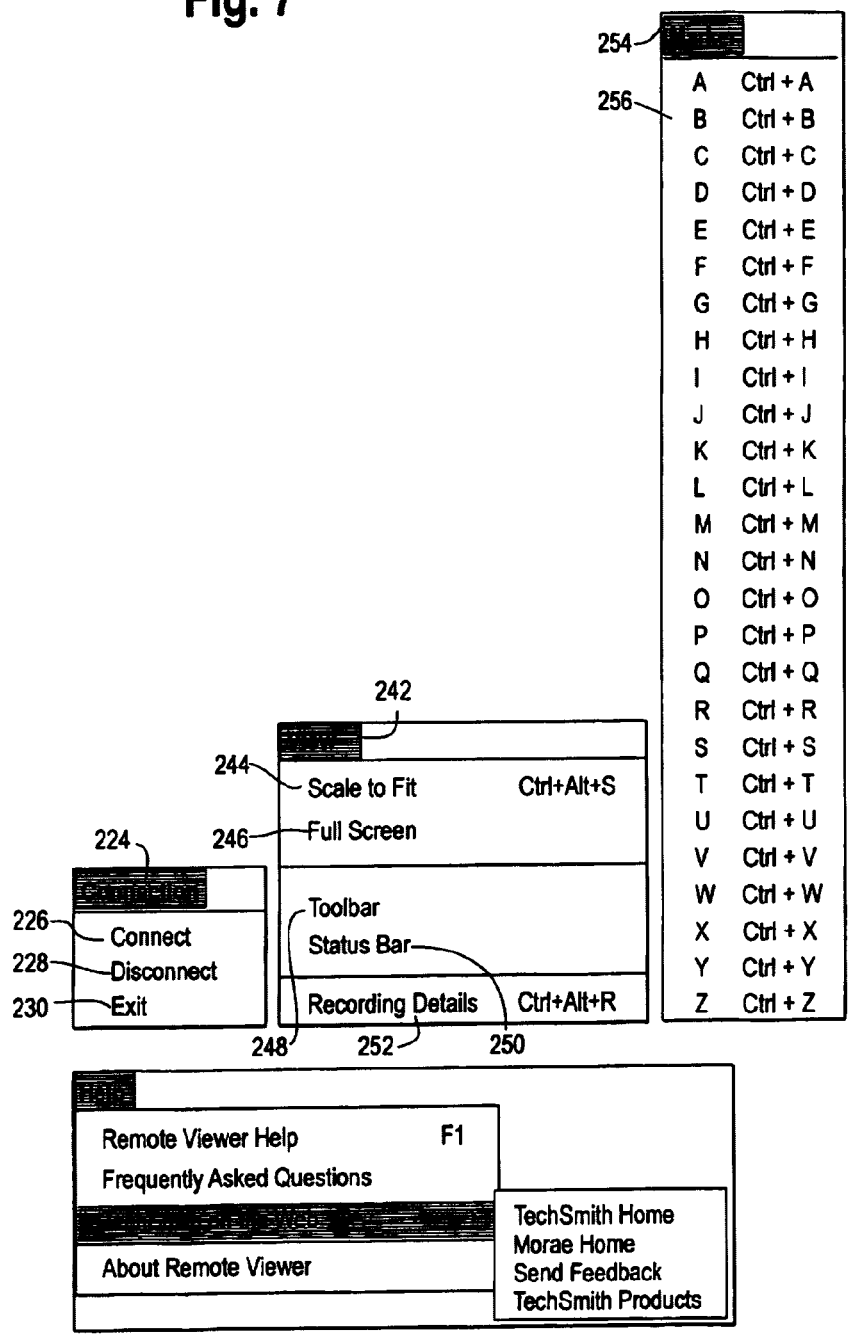
FIG. 7 is a diagram of the Remote viewer drop down menus from the menu bar of the Remote viewer interface screen.
Figure 8:
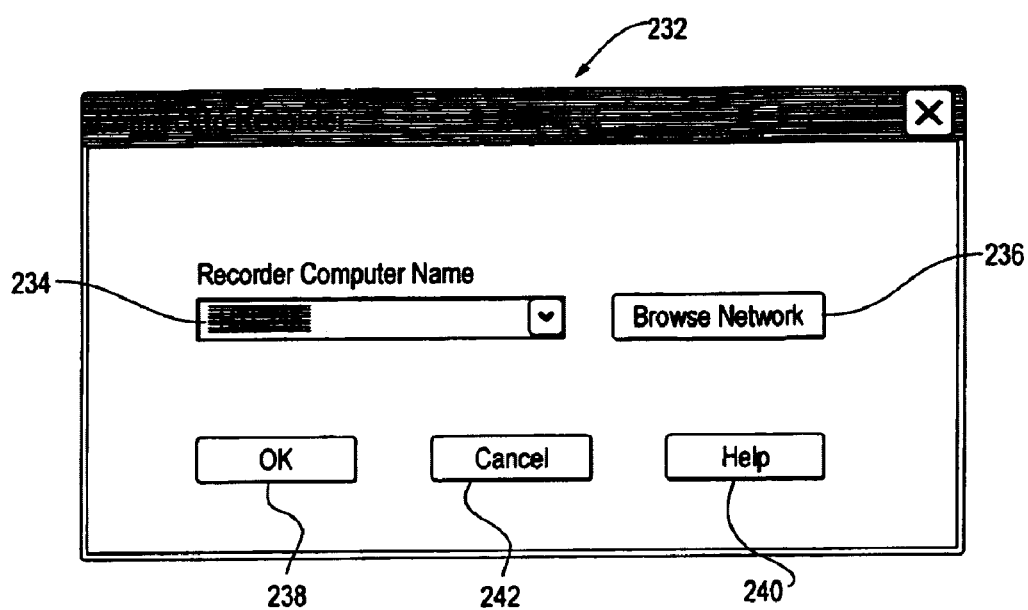
FIG. 8 is a diagram of the recorder dialog box from the connect heading drop down menu from the menu bar of the Remote viewer interface screen.

The Menu Bar 196 consists of a Connection heading 208, a View heading 210, a Marker heading 212, and a Help heading 214. Using the Menu bar 196, the Connection heading 208 is selected which displays a connection heading drop down menu 224, as illustrated in FIG. 7. The connection heading drop down menu 224 provides selections of connect 226, disconnect 228, and exit 230. Selecting connect 226 displays a connect to recorder dialog box 232, as illustrated in FIG. 8. The connect to recorder dialog box 232 provides a recorder computer name option 234 to select the name of the computer on which the Recorder will be running. If the recorder computer name is not available, select the browse network option 236 to locate the proper computer name from the network 56. When the computer name has been selected, select the ok option 238. This process may be designated by the nomenclature of "Connection >Connect". The "Connection" refers to the connection heading 208 and the "Connect" refers to the connect 226.

If there is a problem selecting the proper computer name, select the help option 240 and follow any applicable instructions. If the recorder dialog box 232 was opened inadvertently or by mistake, selecting cancel 242 will cancel the recorder dialog box 232 and return unchanged back to the file heading drop down menu 224.

Alternatively, the connection may be accomplished using the Toolbar 198. The Toolbar 198 consists of a connection icon 216, a toggle full screen icon 218, a toggle scale to fit icon 220, and a set market icon 222. Selecting the connection icon 216 will also automatically open the recorder dialog box 232 to select the recorder computer name to connect to in the same manner as described above. Upon successful connection, proceed to Step 116.

In Step 116, the usability testing or the recording is viewed by the Remote Viewer. The Remote Viewer provides several options for viewing the events that occur in the recording on the source computer 50 using either the default setting or the Menu Bar 196 or Toolbar 198 to select the full screen view or the scale to fit view.

Using the default setting, the normal view is displayed in the viewing window 200. In this normal view, the activity from the source computer 50 is displayed in the maximized window with the Remote Viewer Menu Bar 196, Toolbar 198, and Status Bar 202 remaining visible.

Alternatively, the full screen view may be chosen. In this full screen view, the activity from the source computer 50 is displayed or fills the entire computer screen 53 of the remote viewer computer 52. Using the Menu Bar 196, selecting the view heading 210 displays a view heading drop down menu 242, as illustrated in FIG. 7. The view heading drop down menu 242 provides selections of scale to fit 244, full screen 246, toolbar 248, status bar 250, and recording details 252. Selecting full screen 246 displays the full screen view. This process may be designated by the nomenclature of "View >Full Screen". The "View" refers to the view heading 210 and the "Full Screen" refers to the full screen 246 on the view heading drop down menu 242. Also, using the Toolbar 198, the full screen view may be chosen by selecting the toggle full screen icon 218.

Alternatively, the scale to fit view may be chosen if the screen resolution setting of the source computer 50 is higher than the resolution of the remote viewer computer 52. In this scale to fit view, the activity from the source computer 50 will be scaled to fit and be displayed into the entire computer screen 53 of the remote viewer computer 52. Using the Menu Bar 196, selecting the view heading 210 displays the view heading drop down menu 242, as illustrated in FIG. 7. Selecting the scale to fit 244 displays the scale to fit screen view. This process may be designated by the nomenclature of "View >Scale To Fit". The "View" refers to the view heading 210 and the "Scale To Fit" refers to the scale to fit 244 on the view heading drop down menu 242. Also, using the Toolbar 198, the scale to fit screen view may be chosen by selecting the toggle scale to fit icon 220.

While viewing the usabilitiy test or activity from the source computer 50 in Step 116, the remote viewer may set markers which allow the remote viewer to mark important points in the recording with meaningful labels. The markers consist of alphabet letters (e.g. A through Z) that are assigned a definition in Manager. For example, the marker "A" may be defined as "User asked for help" in Manger, in which case, every marker "A" will be assigned that definition for use in Remote Viewer. Alternatively, a marker may be assigned a name and have a text note field associated with that name. An unlimited number of markers can be set and the same marker may be used repeatedly, if desired. The markers, when used, are sent, in Step 117, from the Remote Viewer on the remote viewer computer 52 to the Recorder on the source computer 50 and ultimately saved within the Recorder, where the markers are synchronized in time with the recorded streams. The markers will then be viewable and searchable in the recording files when imported into the Manager.

The Menu Bar 196 and Toolbar 198 may be used to set the markers in Step 116. Using the Menu Bar 196, selecting the marker heading 212 displays the marker heading drop down menu 254, as illustrated in FIG. 7. The marker heading drop down menu 254 provides markers 256 ranging from alphabet letters A through Z, each previously assigned a particular definition in Manager. Selecting any letter A through Z will enter this particular marker definition into the Recorder under Step 117. This process may be designated by the nomenclature of "Marker >Marker". The "Marker" refers to the marker heading 212 and the "Marker" refers to the marker 256 on the marker heading drop down menu 254. Also, using the Toolbar 198, selecting the set marker icon 222 will display the marker heading drop down menu 254 to set the desired marker 256. When completed with Step 116, proceed to Step 118.

In Step 118, the remote viewer computer 52 and the Remote Viewer is disconnected from the recorder source computer 50 and the Recorder. This is again accomplished using either the Menu Bar 196 or the Toolbar 198.

Using the Menu Bar 196, the Connection heading 208 is selected which displays the connection heading drop down menu 224, as illustrated in FIG. 7. Selecting the disconnect 228 from the connection heading drop down menu 224 disconnects the Remote Viewer from the Recorder. This process may be designated by the nomenclature of "Connection >Disconnect". The "Connection" refers to the connection heading 208 and the "Disconnect" refers to the disconnect 228.

Alternatively, the disconnection may be accomplished using the Toolbar 198. Selecting the connection icon 216 while connected, toggles as a disconnect icon and, thereby, will automatically disconnect the Remote Viewer from the Recorder. Upon successful disconnection, proceed to Manager 62 (FIG. 3).

When completed with the usability test in the Recorder, from the source computer 50, and any Remote Viewer, from the remote viewer computer 52, proceed to the Manger 62 (FIG. 3).

Referring to Step 120, Manager begins. This program enables the user to import recordings created by the Recorder for subsequent analysis and presentation of the usability test results. This program also enable the user to create configuration files for the Recorder.

Figure 9:
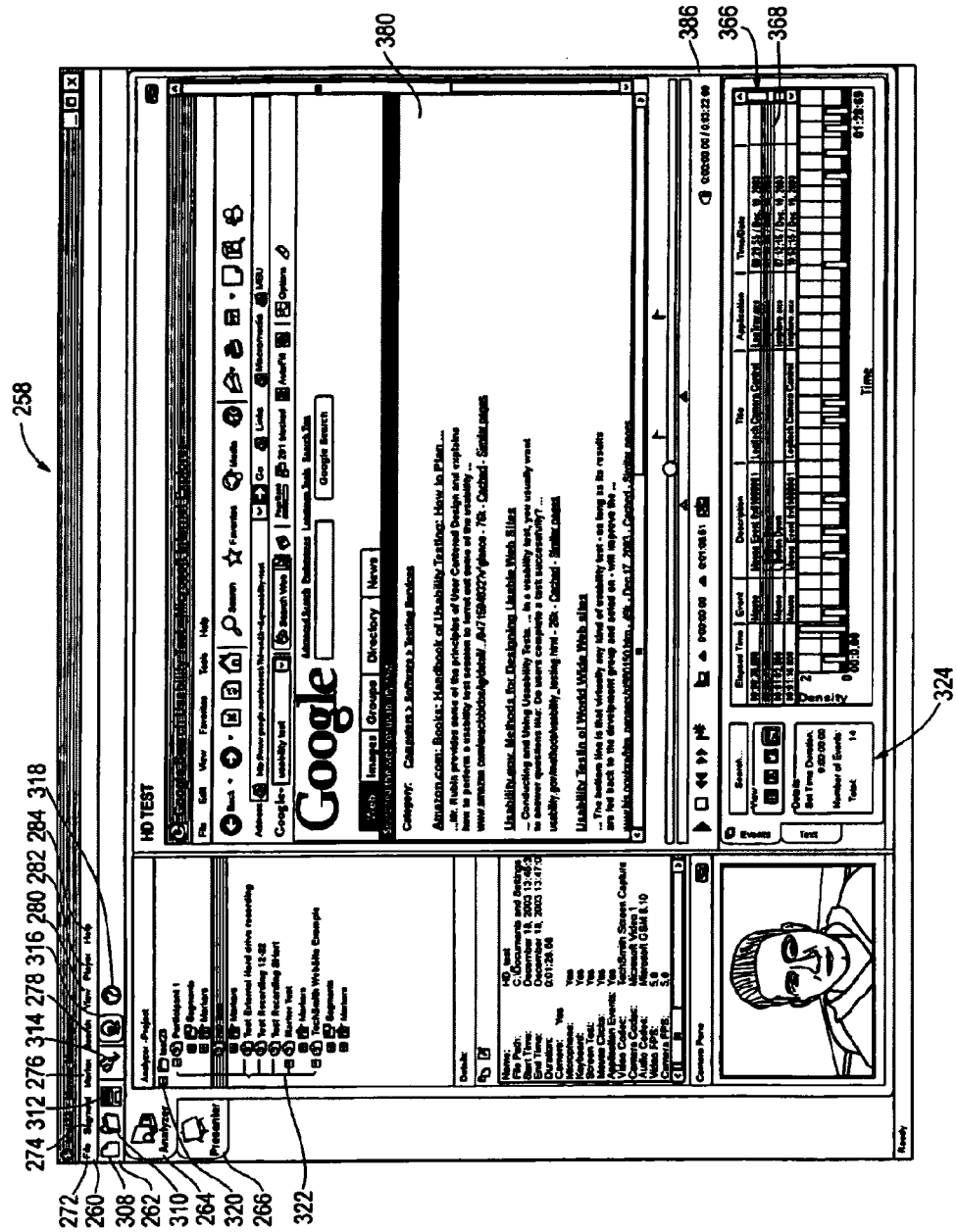
FIG. 9 is a diagram of the Analyzer tab of the Manager interface screen.
Figure 10:
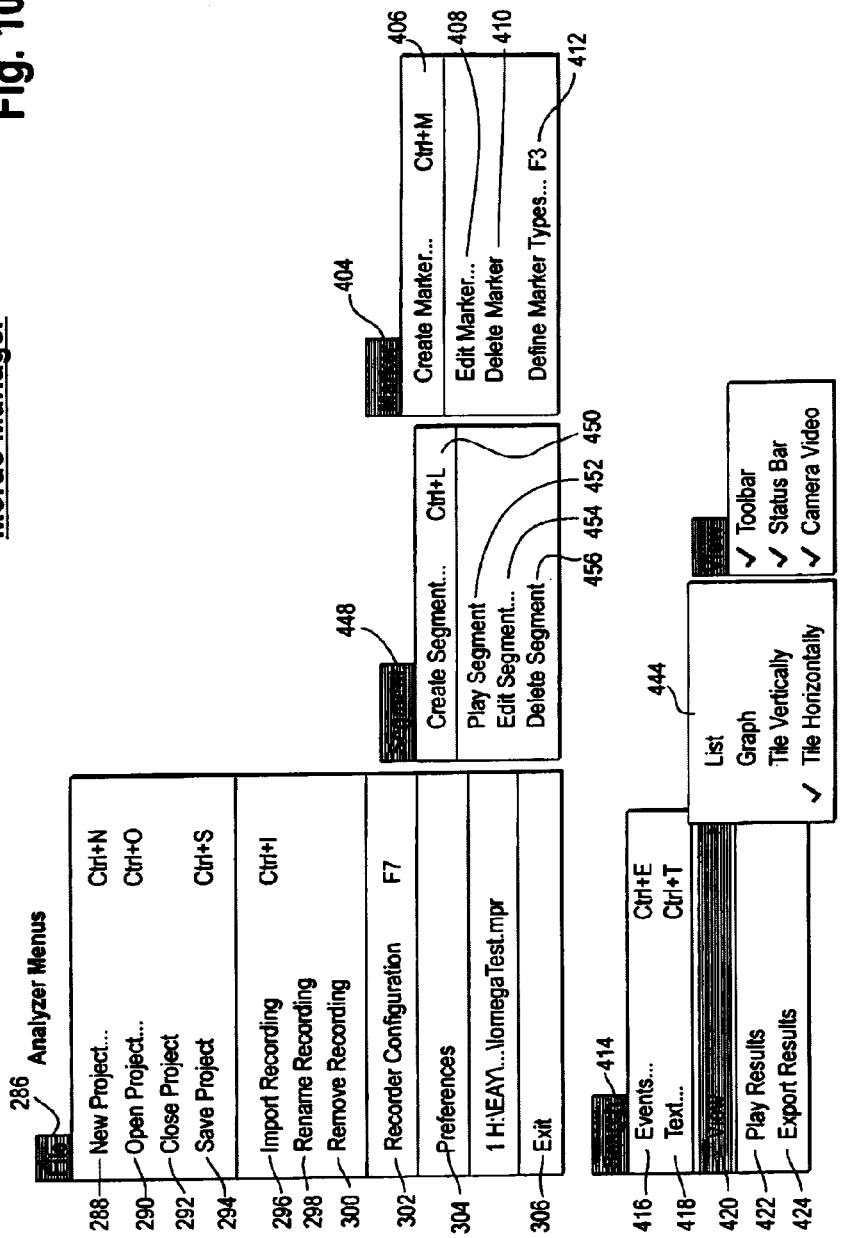
FIG. 10 is a diagram of the Manager drop down menus from the menu bar of the Analyzer tab of the Manager interface screen.

In Step 121, if desired, any number of configuration files of configuration settings for a recording may be created and saved for later use. It is these previously saved configuration files of configuration settings that are selected from in Step 103 of the Recorder. These configuration files of configuration settings may be saved using the Menu Bar 260 and the File heading 272, as illustrated in FIG. 9 and described in further detail below and the analyzer file heading drop down menu 286 and recorder configuration 302, as illustrated in FIG. 10 and described in further detail below. This process may also be designated by the nomenclature of "File >Recorder Configuration". The "File" refers to the File heading 272 and the "Recorder Configuration" refers to the recorder configuration 302.

The Manager is divided into two functions identified by an Analyzer section 268 and a Presenter section 270. Beginning with the Analyzer section 268, proceed to Step 122.

In Step 122, a project can be created or an existing project can be opened. Such a project is required to be opened before a recording of a usability test can be imported into Manager and, thereby, store the recordings as analyzed. A Manager interface 258, as illustrated in FIG. 9, displays the details for the Manager. The Manager interface 258 consists of a Menu Bar 260 which provides access to all of the Manager's options, a Toolbar 262 which provides Manager's most commonly used options within easy reach, an Analyzer tab 264, and a Presenter tab 266. The Analyzer tab 264 permits the recording files to be analyzed in a variety of ways including searching for events and text, creating segments, view and add markers, and other navigation. The Presenter tab 266 permits a highlight video of the results of the analysis of the recording or usability test.

A project may be created using either the Menu Bar 260 or Toolbar 262. The Menu Bar 260 consists of a File heading 272, a Segment heading 274, a Marker heading 276, a Search heading 278, a View heading 280, a Player heading 282, and a Help heading 284. Using the Menu Bar 260, the File heading 272 is selected which displays an analyzer file heading drop down menu 286, as illustrated in FIG. 10. The analyzer file heading drop down menu 286 provides selections of a new project 288, an open project 290, a close project 292, a save project 294, an import recording 296, a rename recording 298, a remove recording 300, a recorder configuration 302, a preferences 304, and an exit 306. Selecting new project 288 permits a name for the project to be entered and opens the project. This process may also be designated by the nomenclature of "File >New Project". The "File" refers to the File heading 272 and the "New Project" refers to the new project 288. Once the new project is named and entered, proceed to Step 123.

Alternatively, a new project may be created using the Toolbar 262. The Toolbar 262 consists of a new project icon 308, open project icon 310, save project icon 312, import recording 314, toggle camera 316, and manager help 318. Selecting the new project icon 308 will also automatically permit the name for a project to be entered and open the project.

In lieu of creating a new project, an existing or previously created project may be opened to import additional recordings into this project. Using the Menu Bar 260, the File heading 272 is selected which displays the analyzer file heading drop down menu 286, as illustrated in FIG. 10. Selecting open project 290 provides access to all of the previously saved projects and permits the desired project name for a project to be entered and opened. This process may also be designated by the nomenclature of "File >Open Project". The "File" refers to the File heading 272 and the "Open Project" refers to the new project 290. Once the new project is named and entered, proceed to Step 123.

Alternatively, an existing project may be opened using the Toolbar 262. Selecting the open project icon 310 will also automatically provide access to all of the previously saved projects and permit the desired project name for a project to be entered and opened.

In Step 123, the recordings to be imported into the new project or existing project (i.e., selected project). This is again accomplished using either the Menu Bar 260 or the Toolbar 262. Using the Menu Bar 260, the File heading 272 is selected which displays the analyzer file heading drop down menu 286, as illustrated in FIG. 10. Selecting import recording 296 provides access to all of the previously usability testing and recordings of those tests and permits the desired recording(s) to be entered and opened into the selected project. This process may also be designated by the nomenclature of "File >Import Recording". The "File" refers to the File heading 272 and the "Import Recording" refers to the import recording 296. Once the recording(s) are selected and entered, the recordings are added to the Analyzer tab 264 of the Manager interface 258. Referring to FIG. 9, in a non-limiting example, the Analyzer 264 depicts the project opened 320 to be "test23" and the recording(s) opened 322 are depicted within the same pane below the project opened 320. Once completed, proceed to Step 124.

Alternatively, any recordings may be opened into the selected project using the Toolbar 262. Selecting the import recording 314 will also automatically provide access to all of the previously saved recordings and permit the desired recordings to be selected, entered, and opened within the selected project.

In Step 124, the analysis of the recordings begins. The recordings may be searched and viewed, sections of the recordings that are of particular interest may be marked, and segments of the recordings may be isolated. Depending upon the analysis desired, proceed to Steps 125, Step 126, or Step 127.

In Step 125, the recordings may be searched and viewed as illustrated in the Search pane 324 of FIG. 9. A clearer depiction of the Search pane 324 is illustrated in FIG. 11. The Search pane 324 is divided into an event search tab 326 and a text search tab 328.

Using the event search tab 326 allows specific events within the recordings to be searched. Selecting the search button 330 displays an event search settings dialog box 332, as illustrated in FIG. 12. The event search settings dialog box 332 consists of a search for group box 334, an applications box 336, and a during box 338.

Using the event search settings dialog box 332, the events to search in the recording include but are not limited to a windows event 340, a keyboard event 342, a mouse click event 344, a web page change event 346, a marker event 348, and a segment event 350.

The application to search for the selected events is selected and displayed in an application box selection 352 of the application box 336. If all the applications are to be used in the search, the application box selection 352 shall display "All Applications".

The time frame of the search is selected in the during box 338 which provides an entire recording time frame 354, an in and out points time frame 356, and a specific time frame 358. If the search is to be conducted over the entire recording, the entire recording time frame 354 should be selected. If the search is to be conducted between two points within the recording, the in and out points time frame 356 should be selected. If the search is to be conducted during a specific time of the date, the specific time frame 358 should be selected with the starting time entered in a starting time box 360 and the ending time entered in an ending time box 362.

Alternatively, the event search may be conducted using the Menu Bar 260. Using the Menu Bar 260, the search heading 278 is selected which displays a search heading drop down menu 414, as illustrated in FIG. 10. The search heading drop down menu 414 provides an event 416, a text 418, a view 420, play results 422, and export results 424. To conduct a search based on the events, select event 416. Selecting event 416 will display the event search settings dialog box 332, as illustrated in FIG. 12. The event search can then be conducted in the same manner as described above. This process may also be designated by the nomenclature of "Search >Event". The "Search" refers to the search heading 278 and the "Event" refers to the event 416.

Once all the search criteria is selected, select the search now button 364 to conduct the search. When the event search is completed, the results are displayed in the results display 366 of the search pane 324. A non-limiting example of an events search results 368 are depicted in the results display 366 in FIG. 11.

Figure 14:
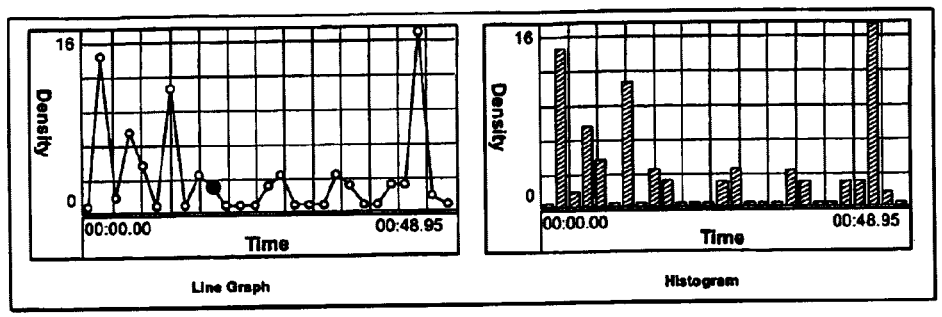
FIG. 14 is a diagram of the graph display of the results from the search pane of the Analyzer tab of the Manager interface screen.

The events search results 368 may be displayed in several different views. A view section 370 in the search pane 324 provides a list display 372 which displays the event search results in a detailed list as illustrated in FIG. 13, a graph display 374 which displays the event search results in a line or histogram graph format as illustrated in FIG. 14, a tile vertically display 376 which displays a combination of the list and graph results with the list display on the left and the graph display on the right, and a tile horizontally display 378 which displays a combination of the list and graph results with the list display on the top and the graph display on the bottom.

Alternatively, the search results 368 may be displayed using the Menu Bar 260. Using the Menu Bar 260, the search heading 278 is selected which displays the search heading drop down menu 414, as illustrated in FIG. 10. Selecting view 420 displays the view options 444 of list, graph, tile vertically, and tile horizontally. Each of these view options are the same as the list display 372, the graph display 374, the tile vertically display 376, and the tile horizontally display 376, respectively, and described above. The event search can then be conducted in the same manner as described above. This process may also be designated by the nomenclature of "Search >Event". The "Search" refers to the search heading 278 and the "Event" refers to the event 416.

Figure 15:
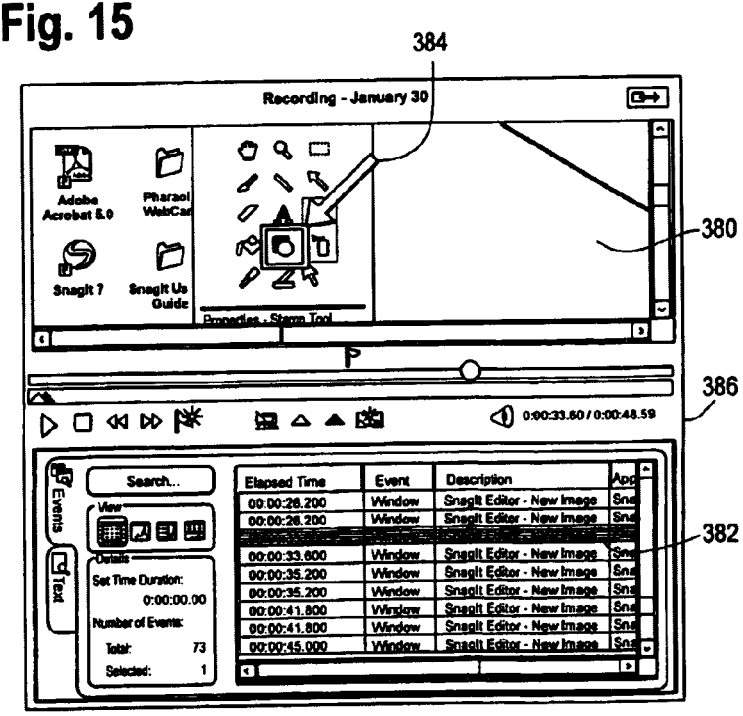
FIG. 15 is a diagram of the player window screen of the list display results from the search pane of the Analyzer tab of the Manager interface screen.

To navigate through all the event search results 368 viewed in the results display 366, the screen video and camera video of any particular event may be viewed in a player window 380 in the analyzer tab 264. For example, with respect to the list display 372 as illustrated in FIG. 15, selecting a particular event 382 will highlight the event in a red box with an arrow 384 in the player window 380. Using the controls 386 at the bottom of the player window 380, the particular event highlighted can be played as a single frame of screen video. If several events are highlighted, each particular event can be played as a series of single frames of screen video similar to a slide show. The single frame and/or series of single frames of screen video will appear and play like a movie for the user.

With respect to graph displays 374 as illustrated in FIG. 16, selecting any sampling point 388 will highlight the event in a red box with an arrow 384. Again, using the controls 386 at the bottom of the player window 380, the highlighted sampling point 388 can be played.

Figure 17:
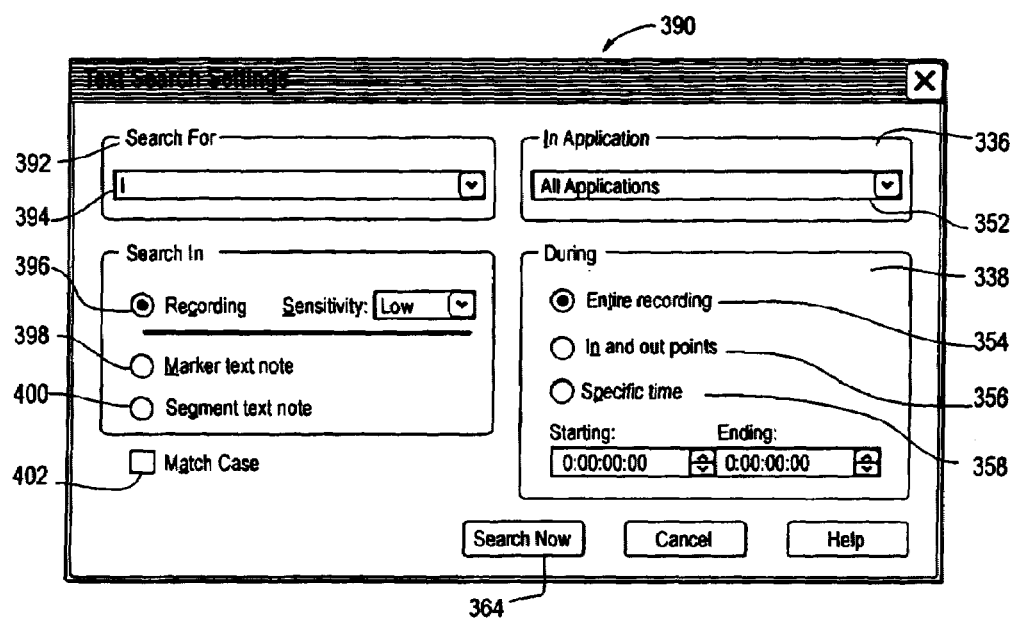
FIG. 17 is a diagram of the text search settings dialog box of the search pane of the Analyzer tab of the Manager interface screen.

Referring back to FIG. 11, the search of the recordings may be conducted using the text search tab 328. Selecting the search button 330 displays a text search settings dialog box 390, as illustrated in FIG. 17. The text search settings dialog box 390 consists of a search for group box 392, an applications box 336, and a during box 338.

Using the text search settings dialog box 390, a specific word or phrase may be searched by entering this information in a text box 394. If the text search is to be conducted in a recording, the recording 396 should be selected. If the text search is to be conducted in a marker, the marker text note 398 should be selected. If the text search is to be conducted in a segment, the segment text note 400 should be selected. If the search is to be limited to only the information as entered taking into consideration the capitalization, the match case 402 is to be selected.

The application to search for the selected text is selected and displayed in the application box selection 352 of the application box 336. If all the applications are to be used in the search, the application box selection 352 shall display "All Applications".

The time frame of the text search is selected in the during box 338 which provides an entire recording time frame 354, an in and out points time frame 356, and a specific time frame 358. If the text search is to be conducted over the entire recording, the entire recording time frame 354 should be selected. If the text search is to be conducted between two points within the recording, the in and out points time frame 356 should be selected. If the text search is to be conducted during a specific time of the date, the specific time frame 358 should be selected with the starting time entered in a starting time box 360 and the ending time entered in an ending time box 362.

Alternatively, the search may be conducted using the Menu Bar 260. Using the Menu Bar 260, the search heading 278 is selected which displays a search heading drop down menu 414, as illustrated in FIG. 10. To conduct a search based on the text, select text 418. Selecting text 418 will display the text search settings dialog box 390, as illustrated in FIG. 17. The text search can then be conducted in the same manner as described earlier. This process may also be designated by the nomenclature of "Search >Text". The "Search" refers to the search heading 278 and the "Text" refers to the text 418.

Once all the search criteria is selected, select the search now button 364 to conduct the text search. When the text search is completed, the results are displayed in the same manner and navigated in the same way and using the same views as that described earlier with respect to the event search.

Search/Analysis: Example #1

The following is an example of the combination of the event and text search function to analyze the recording results and draw conclusions relating to an evaluation of the e-commerce portion of a company's web site that promises an easy online purchase and checkout process. The goal is to find out: (1) the amount of time it takes the participant to get to the receipt page (time on task), (2) the number of web pages (and their URLs) the participant goes through to get to the receipt page, and (3) the number of clicks it takes for the participant to get through the purchase process.

The example starts on the next page.

Search/Analysis Steps

You would take the following search and analysis steps to locate the information you need:

Step 1: Finding the Task End Point:

Begin by finding the task end point, which is the receipt page in this example. You know that the receipt page has the text "Thank you for shopping at TechSmith" at the top of it. Perform a Text search for this phrase in the application Internet Explorer.

Figure 27:
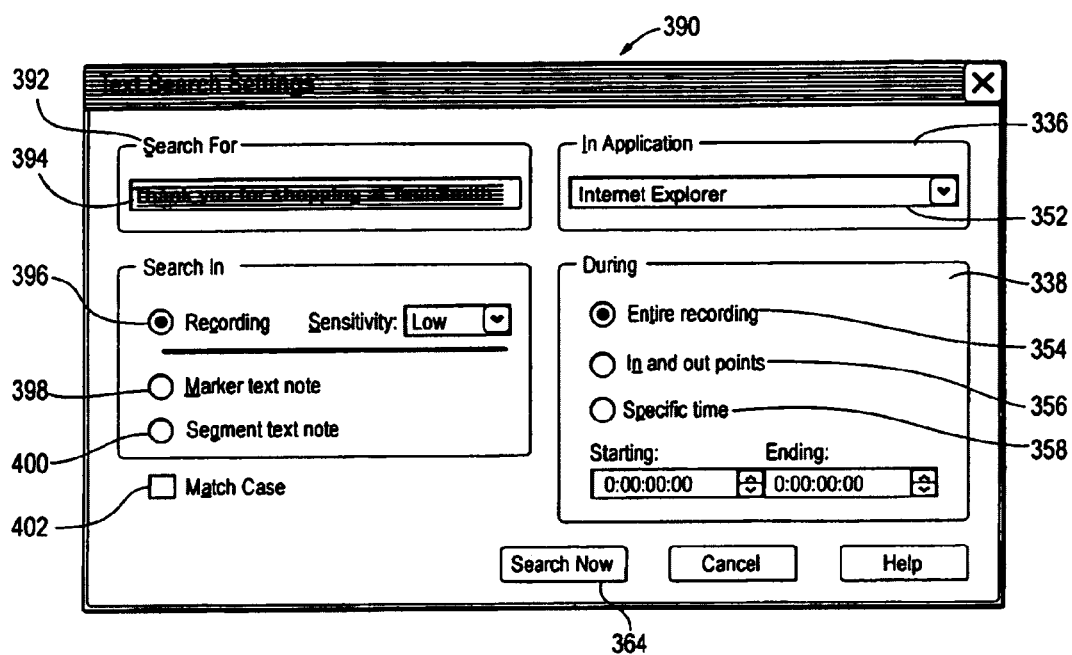
FIG. 27 is step 1 of an example to find the task end point using the diagram of the text search settings dialog box of the search pane of the Analyzer tab of the Manager interface screen.
Figure 28:
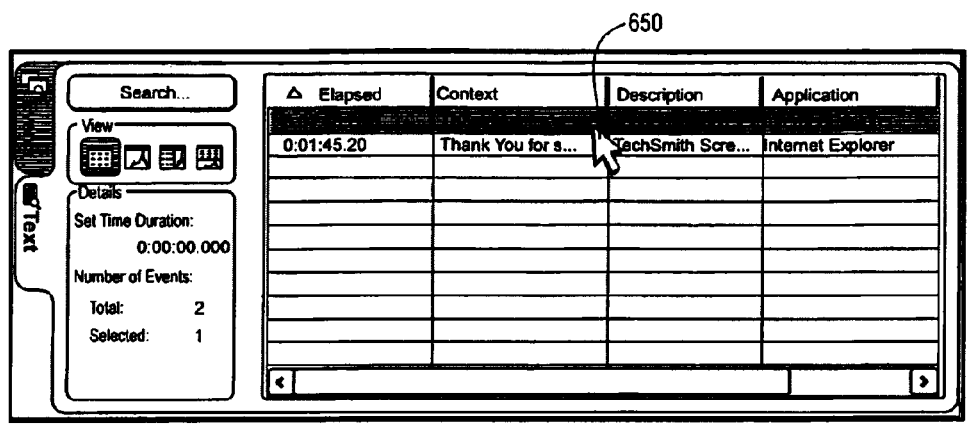
FIG. 28 is step 1 of an example to find the task end point using the diagram of the list display of the results from the search pane of the Analyzer tab of the Manager interface screen.

To Conduct this Search:
1. Click on the recording in the Project pane, as illustrated in FIG. 9, to select it.
2. Choose the Text Search tab 328 in the Search pane 324, as illustrated in FIG. 11, and click the Search button 330.
3. The TextSearch Settings dialog box 390, as illustrated in FIG. 27, will open. Enter the following search criteria:
   Search For—"Thank you for shopping at TechSmith"; Search In—Recording; Sensitivity—Low; In Application—Internet Explorer; During—Entire recording.
4. Choose Search Now 364 to conduct the search and view your results. This will tell you exactly where your defined task successfully ended in the recording, as illustrated in FIG. 28.

Note: You may get several identical results from a search, even with the Sensitivity set on Low. This is due to the capacity to sense minute differences in the results that are beyond human recognition. The identical results can be considered equally valid. Select one of the results in the list as your task end point.

Figure 29:
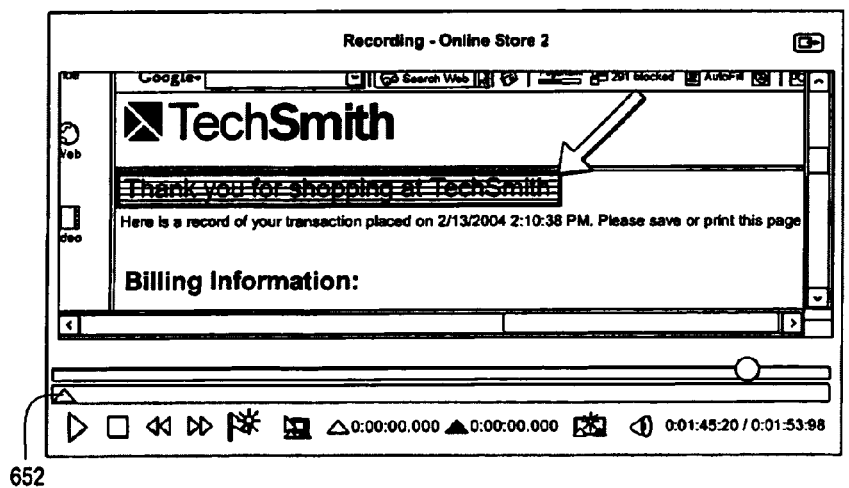
FIG. 29 is step 1 of an example to find the task end point using the diagram of the player window screen of the list display results from the search pane of the Analyzer tab of the Manager interface screen.

5. Select the end point 650 in the list of results, and the video will jump to that point. You will see the text you searched for highlighted in the Player Window, as illustrated in FIG. 29.
6. Having found the end point, choose the Set Out Point button 652 to mark this as your Out Point.

Step 2: Finding the Task Start Point

Use a similar search to find the beginning of the task. In this example, let's say the task start point is when the user arrives at the first screen in the purchase process. We know that this page contains the text "Order TechSmith Products Online."

Figures 30, 31:
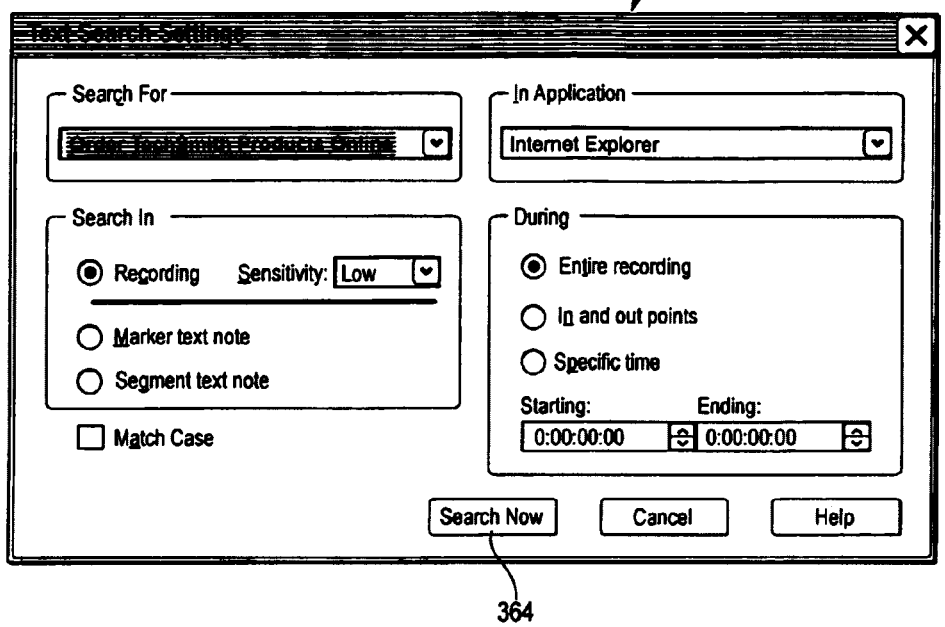
FIG. 30 is step 2 of an example to find the task start point using the diagram of the text search settings dialog box of the search pane of the Analyzer tab of the Manager interface screen.
FIG. 31 is step 2 of an example to find the task start point using the diagram of the list display of the results from the search pane of the Analyzer tab of the Manager interface screen.

To Conduct this Search:
1. Click on the recording in the Project pane, as illustrated in FIG. 9, to select it.
2. Choose the Text Search tab 328 in the Search pane 324, as illustrated in FIG. 11, and click the Search button 330.
3. The Text Search Settings dialog box 390, as illustrated in FIG. 30, will open. Enter the following search criteria:
   Search For—"Order TechSmith Products Online"; Search In—Recording; Sensitivity—Low; In application—Internet Explorer; During—Entire recording.
4. Choose Search Now 364 to conduct the search and view you results. This will tell you exactly where your defined task began in the recording, as illustrated in FIG. 31.

Figure 32:
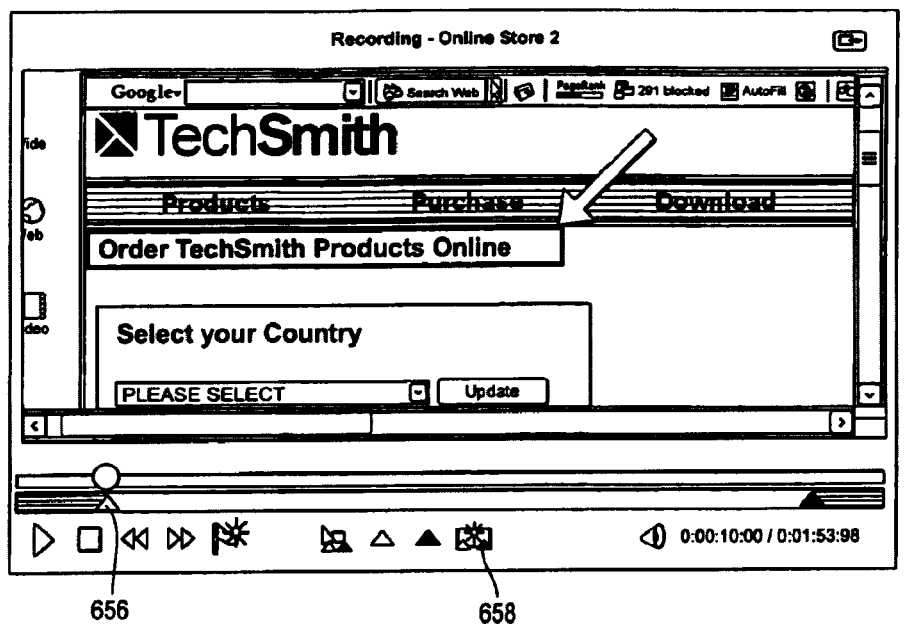
FIG. 32 is step 2 of an example to find the task start point using the diagram of the player window screen of the list display results from the search pane of the Analyzer tab of the Manager interface screen.

5. Select the start point 654 in the list of results, and the video will jump to that point. You will see the text you searched for highlighted in the Player Window, as illustrated in FIG. 32.
6. Having found that start point, choose the Set In Point button 656 to mark this as your In Point.

Step 3: Calculating Time on Task

Figure 19:
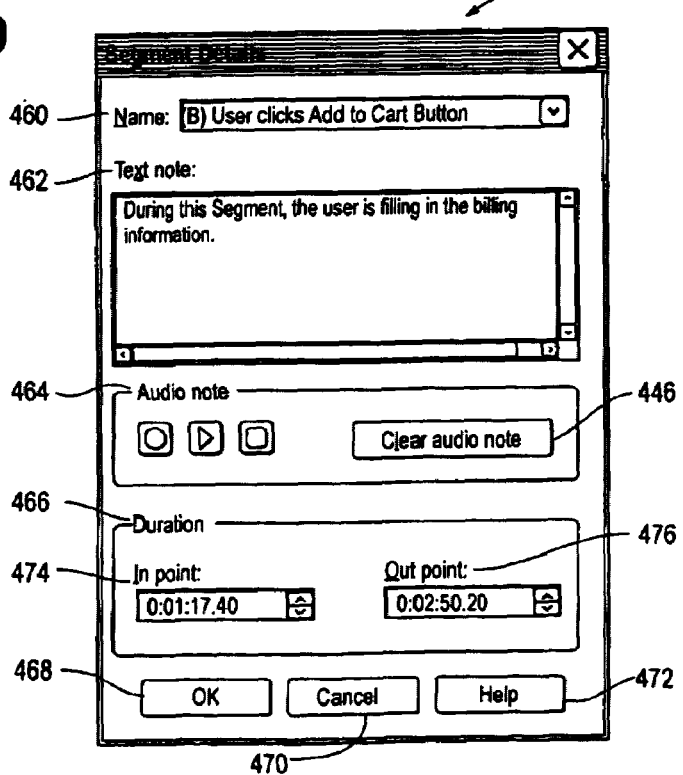
FIG. 19 is a diagram of the segment details dialog box from the segment heading drop down menu from the menu bar of the Analyzer tab of the Manager interface screen.

Now that you have your In Point and Out Point set, click the Create Segment button 658. This will open the Segment Details dialog box 458, as illustrated in FIG. 19. Name this Segment "Time on Task" and enter a text description, if you wish. Choose OK to create the Segment.

Figure 33:
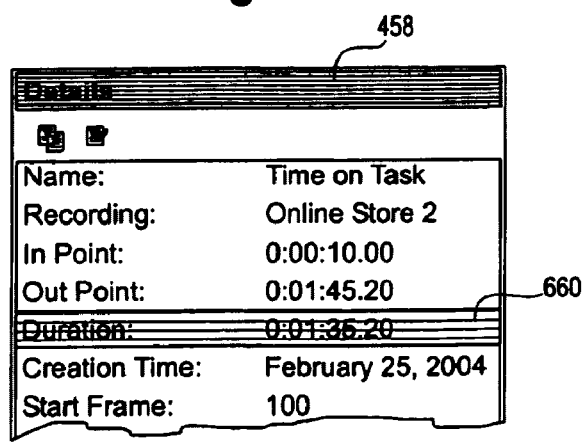
FIG. 33 is step 3 of an example to calculate the time on task using the diagram of the segment details dialog box from the segment heading drop down menu from the menu bar of the Analyzer tab of the Manager interface screen that providing a time on task option for obtaining duration information.

When you select the "Time on Task" Segment in the Project pane, the Duration 660 of the Segment will be shown in the Details pane, as illustrated in FIG. 33. This duration is the time on task.

Result: In this example, the time on task was 1 minute and 35 seconds.

Step 4: Calculating the Number of Mouse Clicks and Web Page Changes

Perform an Event Search for the Mouse Clicks and Web page changes that occurred during the "Time on Task" Segment.

Figure 34:
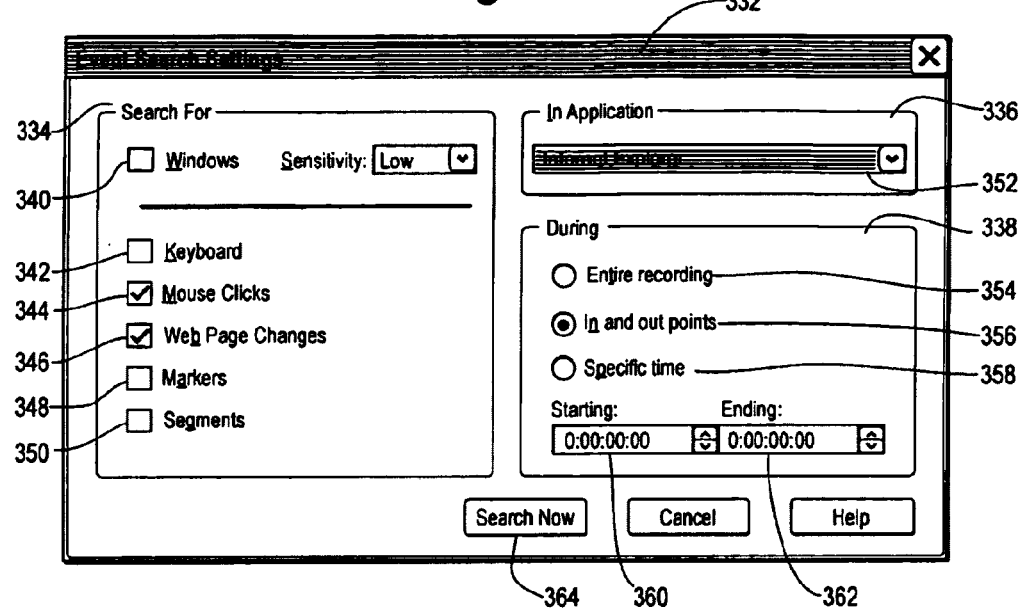
FIG. 34 is step 4 of an example to calculate the number of mouse clicks and web page changes using the diagram of the event search settings dialog box of the search pane of the Analyzer tab of the Manager interface screen.
Figure 35:
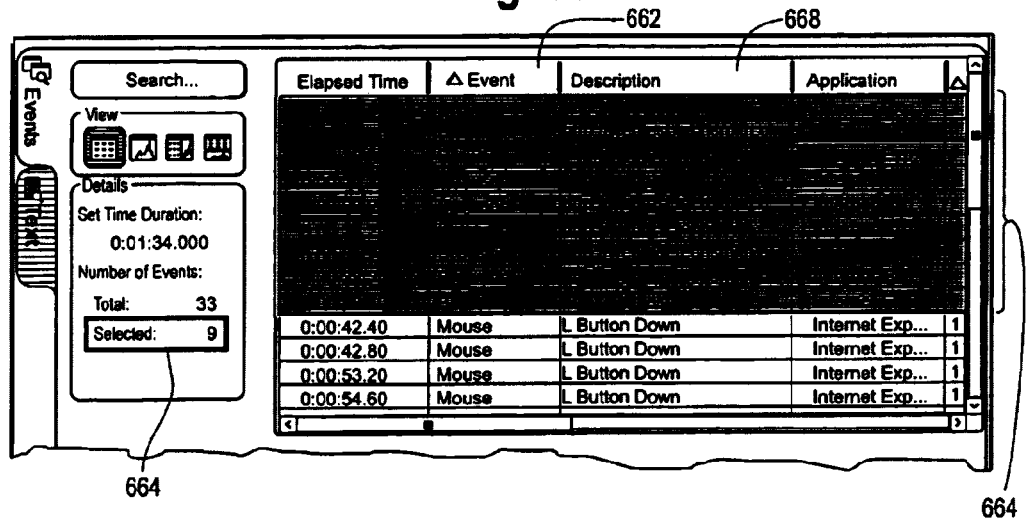
FIG. 35 is step 4 of an example to calculate the number of web page changes using the diagram of the list display of the results from the search pane of the Analyzer tab of the Manager interface screen.
Figure 36:
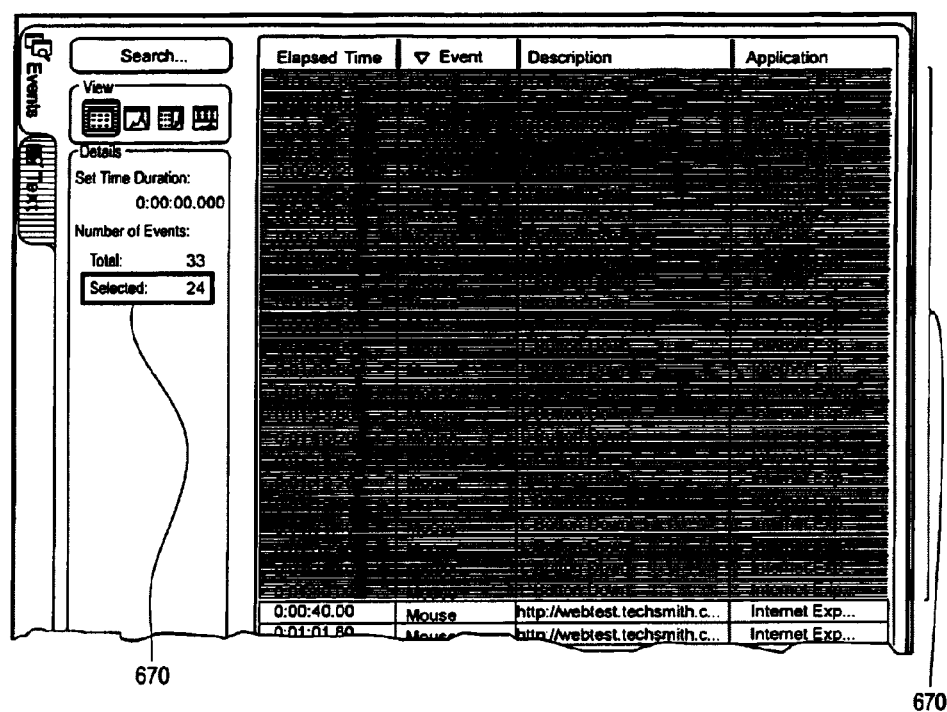
FIG. 36 is step 4 of an example to calculate the number of mouse clicks using the diagram of the list display of the results from the search pane of the Analyzer tab of the Manager interface screen.

To Conduct this Search:
1. Select the "Time on Task" Segment in the Project pane.
2. Choose the Event Search tab 326 in the Search pane 324, as illustrated in FIG. 11, and click the Search button 330. The EventSearch Settings dialog 332 box will open, as illustrated in FIG. 34.
3. Enter the following search criteria:
   Search For—Mouse Clicks 344 and Web Page Changes 346; In Application—Internet Explorer 352; During—In and out points 356.
4. Choose Search Now 364 to conduct the search. The results will be listed sorted by elapsed time, not by Event type, as illustrated in FIG. 35. To separate the results by Event type, click on the Event column title bar 662.
5. Select the top Browser event in the list, then SHIFT+click on the last Browser event. The Details area, as depicted by 664, will show that there were 9 Web page changes. The URLs for the Browser events are shown in the Description column 668.
6. Next, select the top Mouse event in the list, then SHIFT+click on the last Mouse event.
   The Details area, as depicted by 670 in FIG. 36, will show that there were 24 Mouse events.

Results: In this example, it took the participant 9 Web page changes and 24 Mouse Clicks to get to the receipt page.

That's it! You have all of the information you need for your analysis.

Figure 26:
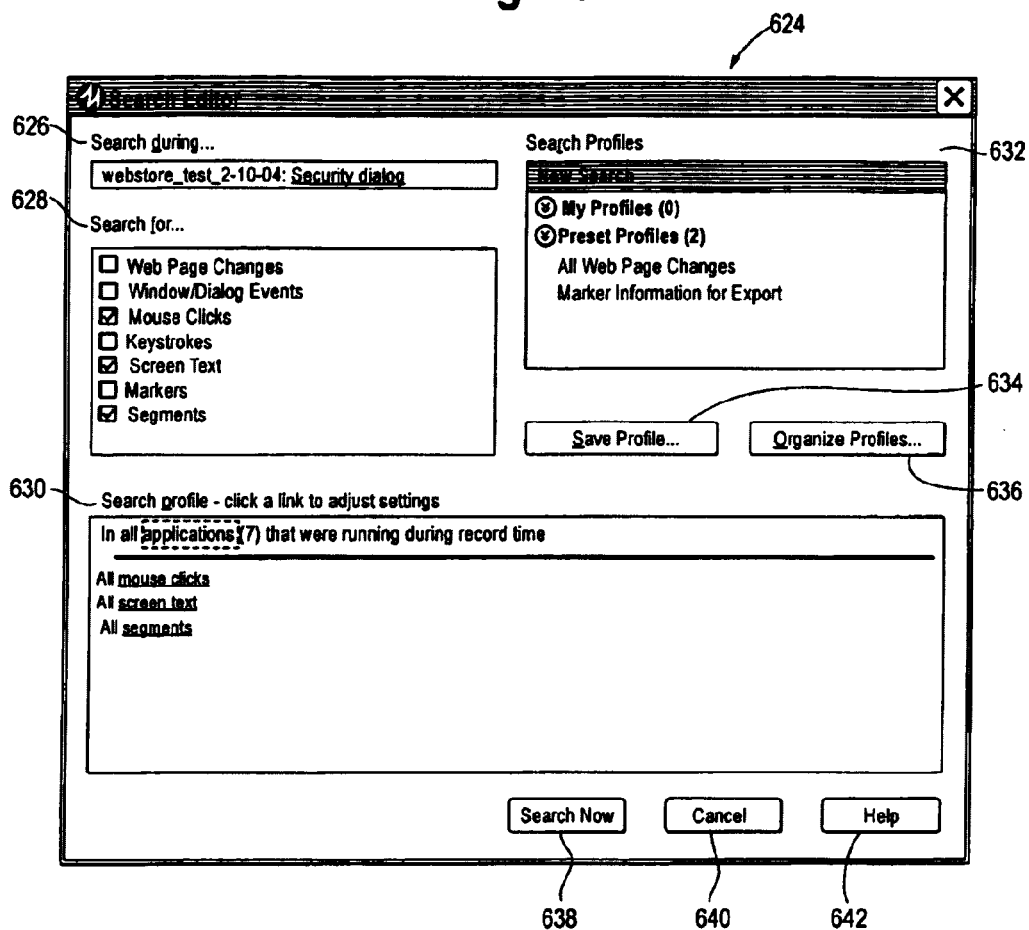
FIG. 26 is a diagram of an alternate embodiment of the search settings dialog box of the search pane of the Analyzer tab of the Manager interface screen.

Alternatively, the event search tab 326 and text search tab 328 can be replaced by a Search editor 624 as illustrated in FIG. 26. The Search editor 624 displays a search during box 626, a search for box 628, a search profile box 630 and 632, a save profile 634, a organize profile 636, a search now button 638, a cancel button 640, and a help button 642. Using the Search editor 624, the input streams to search for in the recording are selected in the search for box 628 and include but are not limited to web page changes, window/dialog events, mouse clicks, keystrokes, screen text, markers, and segments. Upon selecting an input stream in the search for box 628, the search profile box 630 displays the selected input stream and indicates for that particular input stream that the search will be conducted on "all" the activity relating to that input stream.

For example, as illustrated in FIG. 26, mouse clicks has been selected in the search for box 628. As a result, the search profile box 630 will display "All mouse clicks" which means that the search is to be conducted for "all" of the mouse clicks that occurred during the search during 626 selection. Should the searcher desire to limit the search of the mouse clicks to a specific mouse click such as "left" mouse clicks only, the searcher selects the "All mouse clicks" displayed in the search profile box 630 and then selects the specific search from the entries provided.

The time frame of the search is selected in the search during box 626 and provides the same time frames as the during box 338 in the event search settings dialog box 332 and text search settings dialog box 390.

If the criteria selected in the Search editor 624 is to be saved for later use or future searching, the save profile button 634 is selected for saving the search criteria and in the location provided in the search profile 632.

Search/Analysis: Example #2

A usability researcher is conducting a study to determine how many actions a user must take in order to complete the checkout process on an e-commerce Web site. The researcher meets with a user and asks them to perform the task of purchasing a software license from the site. Recorder is installed and running on the recorder computer 50 that the user interacts with, recording everything that happens, including video of the screen, video of the user, and all the system events (i.e., mouse clicks, keyboard entry, Web page changes, window/dialog events, and text that appears onscreen.)

After the user completes the task, the researcher saves the recording file created by Recorder. The process is repeated with several different participants in order to get a sample of various users. Once all of the users have completed the task, the researcher is ready to begin analyzing the results using Manager.

The researcher imports the recording files that were created by Recorder into a project file in Manager. Next, the researcher is able to view the screen and camera video as well as hear the audio from the user by playing the recording. In order to find out the details about how many actions and how long the task took for each user, the researcher will use Manager's search functionality.

The researcher's goals are to determine:

1. How many Web pages a user viewed in order to complete the purchase

2. How long it took the user to complete the purchase

3. How many mouse clicks were required to complete the purchase

Without using the search functionality, the researcher would have to watch the video and try to count all of the steps the user took to complete the task. Doing so would be extremely difficult and take a tremendous amount of time. Instead, using Manager's search functionality, the researcher can find this information quickly and easily.

Figure 37:
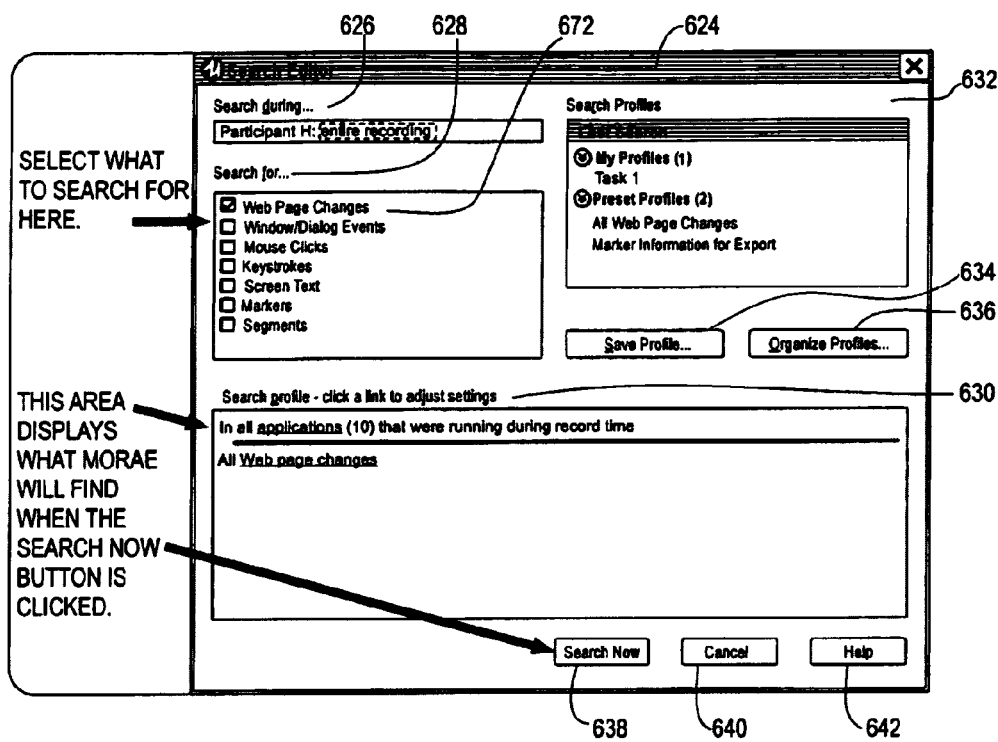
FIG. 37 is a step in a second example using the diagram of the alternate embodiment of the search settings dialog box of the search pane of the Analyzer tab of the Manager interface screen.

To begin, the researcher clicks on the Search button inside the Search pane in Manager's Analyzer tab. This brings up a dialog box that enables the researcher to specify what to search for from the Search editor 624, as illustrated in FIG. 37.

The first step in the search is to find when and where the user completed the task, and what Web pages were viewed during the process. To find these data, the researcher chooses to search for all Web page changes 672.

Figure 38:
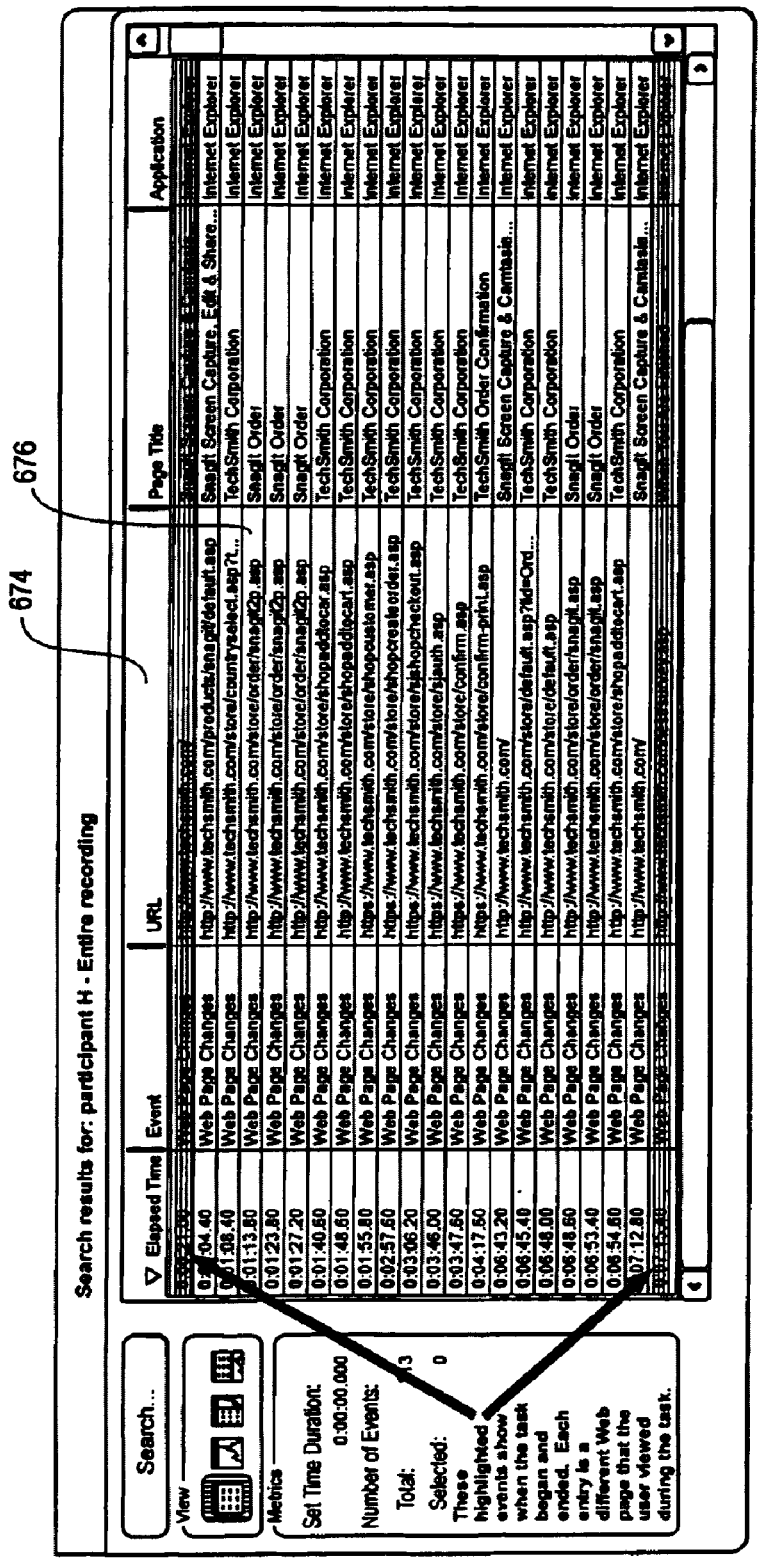
FIG. 38 is another step in the second example using the diagram of an alternate embodiment of the list display of the results from the search pane of the Analyzer tab of the Manager interface screen.

With this option selected, Manager will search the recording file for all Web page changes that occurred during the recording. The researcher then clicks the Search Now button 638 to conduct the search, and the search list is populated with the results, as illustrated in FIG. 38.

The researcher can quickly see from the search results exactly which Web pages the user viewed, when he/she viewed them, and how long they stayed on each page. The researcher can now answer the first goal of the study; it took this user 22 Web pages to complete the purchase process.

Figure 39:
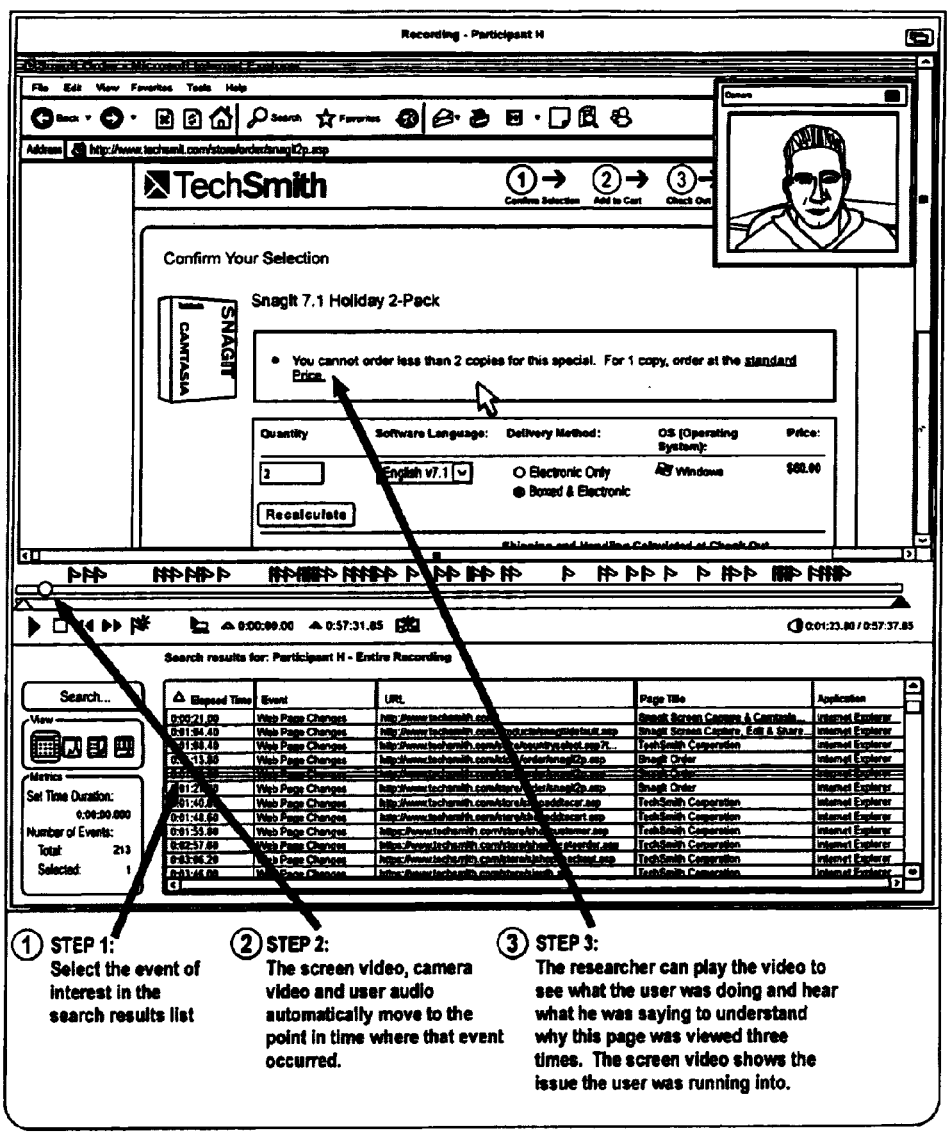
FIG. 39 is another step in the second example using the diagram of the player window screen of the list display results from the search pane of the Analyzer tab of the Manager interface screen.

By looking at the URLs 674, the researcher can identify if a user viewed an unexpected page. For example, the fourth entry 676 in the list is repeated twice. This shows that the user viewed the same page three times in a row. The researcher did not expect this, and wants to understand why. As illustrated in FIG. 39, by selecting the event in the list (i.e., Step 1), the video and audio recordings automatically move to the point in time where that Web page was loaded by the user (i.e., Step 2).

With the events indexed to the video, the researcher can now play the video to see what the user was doing and saying. It is clear from the message displayed on the Web page (i.e., Step 3) that the user tried to order a quantity less than two for a special promotion that was only available on two copies.

Because Morae indexes the video with the events, it is very easy to find where specific actions occurred in the video automatically. The researcher doesn't have to watch the entire video, or try fast forwarding and rewinding to find when an action happened. By searching for events and then selecting an event, the video instantly moves to the point in time where that event occurred.

The researcher is able to conduct many different searches repeatedly to determine where and when the user was having difficulty or getting confused in the process, and answer the remaining goals of the study. By capturing the video and audio of the user, the researcher is able to hear what the user was saying and see the user's facial expressions, which provide rich qualitative information about how the user is reacting to the purchase process. Utilizing the search functionality to find information and navigate the video makes the analysis process much faster.

Referring back to FIG. 3 and, upon completion of Step 125, proceed to Step 126. In Step 126, just as markers 256 were set during the recording in Remote Viewer, the same or additional markers can be added to the recording in the Analyzer section 268. This again is accomplished using either the Menu Bar 260, as illustrated in FIG. 9.

Figure 18:
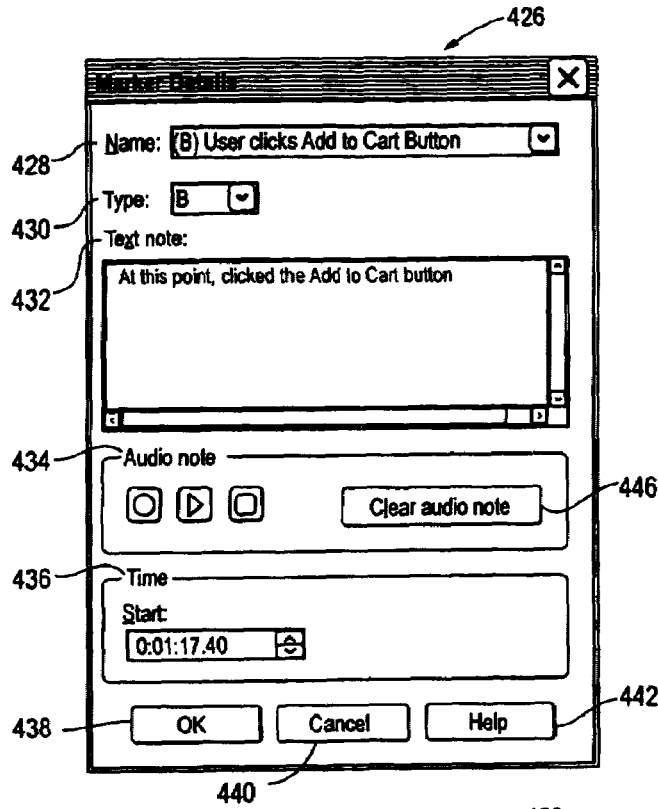
FIG. 18 is a diagram of the marker details dialog box from the marker heading drop down menus from the menu bar of the Analyzer tab of the Manager interface screen.

Using the Menu Bar 260, the marker heading 276 is selected which displays a marker heading drop down menu 404, as illustrated in FIG. 10. The marker heading drop down menu 404 provides a create marker 406, an edit marker 408, a delete marker 410, and a define marker types 412. Selecting create marker 406 displays a marker details dialog box 426, as illustrated in FIG. 18. The marker details dialog box 426 provides a marker name 428, a marker type 430, a text note 432, a audio note 434, a time 436, an ok button 438, a cancel button 440, and a help button 442. This process may also be designated by the nomenclature of "Marker >Create Marker". The "Marker" refers to the marker heading 276 and the "Create Marker" refers to the create marker 406.

To create the marker using the marker details dialog box 426 (i.e., flag or annotate specific points in time during a recording), the desired marker is inserted into the name 428 and the identifying letter of the marker is inserted into the type 430. With respect to the identifying letter of the marker inserted into type 430, this is the same as the marker 256 in the marker heading drop down menu 254 used in the Remote Viewer. Any text notes can be entered into the text note 432. The text notes have no character limit and their contents are fully searchable. Any audio notes can be entered into the audio note 434. An audio note can be created using the attached microphone 57. If the audio note 434 is not to be included, it can be cleared from the recording by selecting the clear audio note button 446. When the settings are entered, select the ok button 438 to create the marker. If the settings are not accurate, select the cancel button 440 to exit from the marker details dialog box 426. When completed, proceed to Step 127 of FIG. 3.

In Step 127, sections of a recording that are of a particular interest can be isolated within the recording and saved in the Analyzer section 268. This again is accomplished using either the Menu Bar 260, as illustrated in FIG. 9.

Using the Menu Bar 260, the segment heading 274 is selected which displays a segment heading drop down menu 448, as illustrated in FIG. 10. The segment heading drop down menu 448 provides a create segment 450, a play segment 452, a edit segment 454, and a delete segment 456. Selecting create segment 450 displays a segment details dialog box 458, as illustrated in FIG. 19. The segment details dialog box 458 provides a segment name 460, a text note 462, an audio note 464, a duration 466, an ok button 468, a cancel button 470, and a help button 472. This process may also be designated by the nomenclature of "Segment >Create Segment". The "Segment" refers to the segment heading 274 and the "Create Segment" refers to the create segment 450.

To create the segment using the segment details dialog box 458, the name of the segment is inserted into the segment name 460. The text note 462 and audio note 464 are entered and used in the same manner as described above for markers. As segments define a specific time frame during the recording, this is set in the duration 466. An in point 474 is inserted which defines when the segment begins and an out point 476 is entered which defines when the segment ends. When the settings are entered, select the ok button 468 to create the segment. If the settings are not accurate, select the cancel button 470 to exit from the segment details dialog box 458. When completed, proceed to the Presenter section 270 and Step 128 of FIG. 3.

In Step 128, highlight videos or video presentation of the results of the analysis of the recording or usability test from the Analyzer section 268 can be created. As discussed in more detail below, a highlight video is composed of a series of video clips arranged on a storyboard. The video clips are copies of selected sections of the segments or the recording that are to be included in the highlight video. The video clips do not alter the original session recording.

Figure 20:
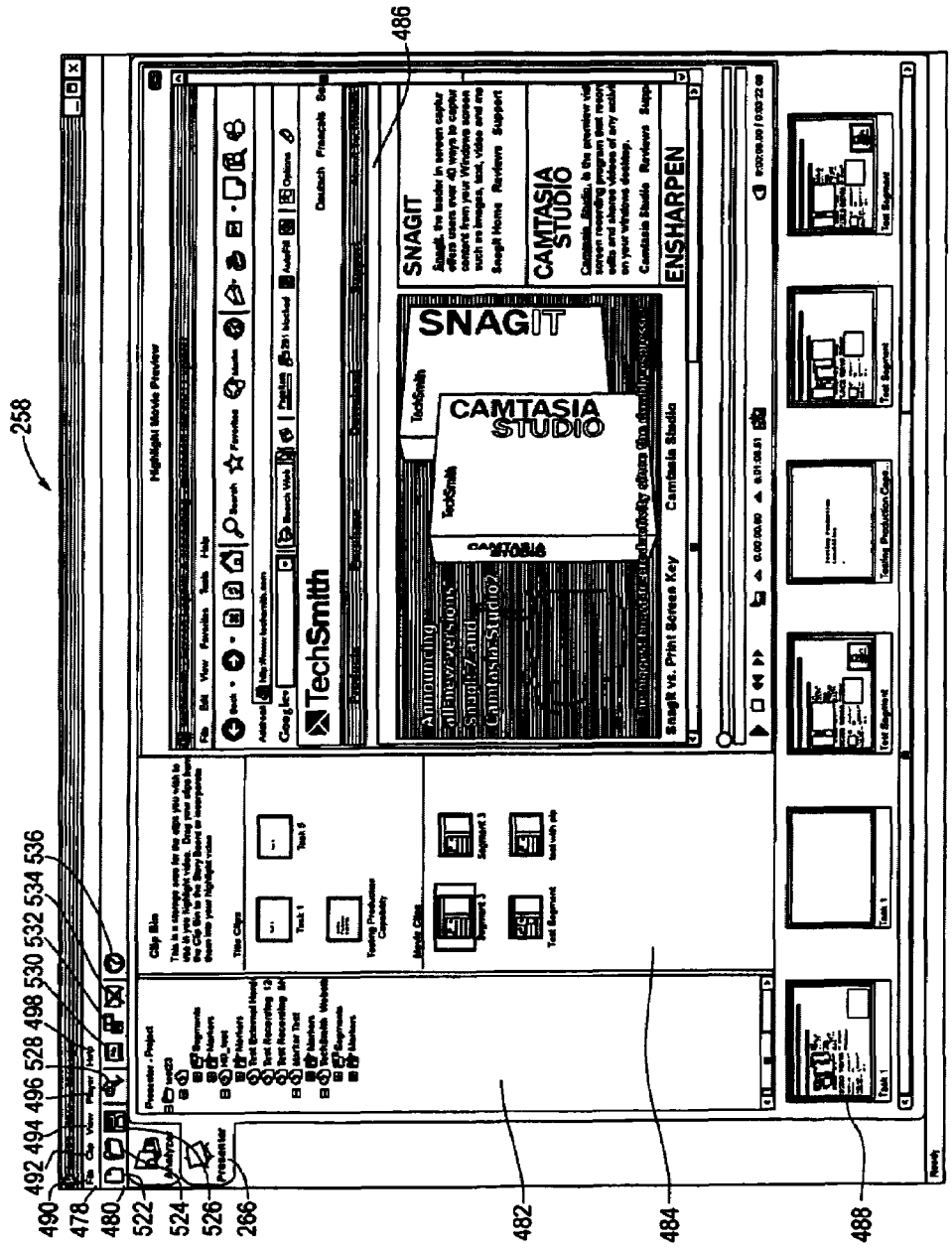
FIG. 20 is a diagram of the Presenter tab of the Manager interface screen.
Figure 24:
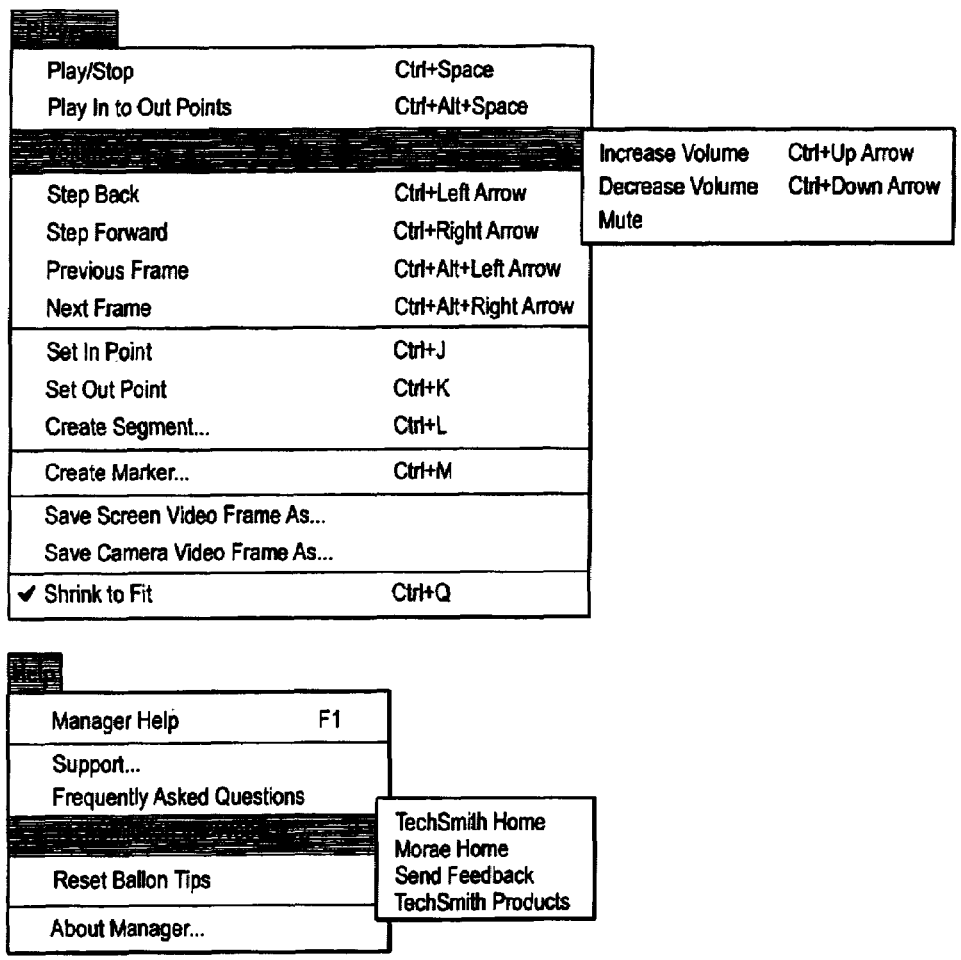
FIG. 24 is a diagram of the player drop down menu from the menu bar of the Presenter tab of the Manager interface screen.

Referring to FIG. 20, the manager interface 258 illustrates the presenter tab 266 more clearly. The Manager interface 258 consists of a Menu Bar 478 which provides access to all of the Manager's options for the presenter tab 266, a Toolbar 480 which provides Manager's most commonly used options for the presenter tab 266 within easy reach, a presenter project pane 482 which lists all the recordings and segments created previously, a clip bin 484 where the clips that are created for a highlight video are stored and organized, a player window 486 where the screen video from selected recordings, segments, markers, or clips are displayed (the controls for using the player window 486 are illustrated in FIG. 24), and a storyboard 488 where the clips in the clip bin 484 can be organized into the desired order for the highlight video.

Figure 21:
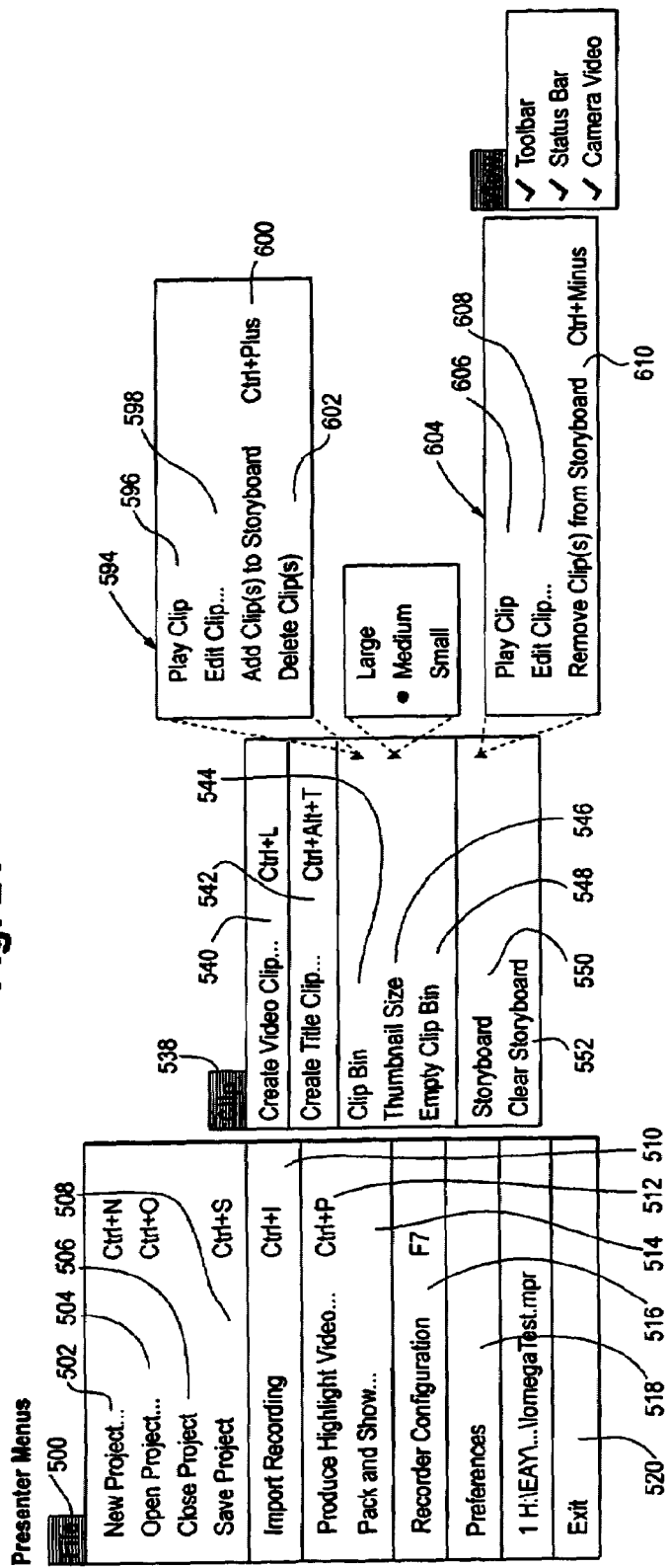
FIG. 21 is a diagram of the Manager drop down menus from the menu bar of the Presenter tab of the Manager interface screen.

Before a highlight video of video and title clips can be created, the projects containing the desired recordings, segments, or markers, must be opened into the presenter project pane 482. This information can be opened using either the Menu Bar 478 or Toolbar 480. The Menu Bar 478 consists of a File heading 490, a Clip heading 492, a View heading 494, a Player heading 496, and a Help heading 498. Using the Menu Bar 478, the File heading 490 is selected which displays a presenter file heading drop down menu 500, as illustrated in FIG. 21. The presenter file heading drop down menu 500 provides selections of a new project 502, an open project 504, a close project 506, a save project 508, an import recording 510, a produce highlight video 512, a pack and show 514, a recorder configuration 516, a preferences 518, and an exit 520. Selecting new project 502 permits a name for the project to be entered and opens the project. This process may also be designated by the nomenclature of "File >New Project". The "File" refers to the File heading 490 and the "New Project" refers to the new project 502. If an existing project is to be opened into the presenter project pane 482, selecting open project 504 permits a name for an existing project to be entered and opened. This process may be designated by the nomenclature of "File >Open Project". The "File" refers to the File heading 490 and the "Open Project" refers to the open project 504.. Likewise, if a particular recording is to be imported into the currently open project, selecting import recording 510 permits a recording to be imported into the project. This process may be designated by the nomenclature of "File >Import Recording". The "File" refers to the File heading 490 and the "Import Recording" refers to the import recording 510.

Alternatively, a new project, an existing project, or any recording may be opened or imported using the Toolbar 480. The Toolbar 480 consists of a new project icon 522, open project icon 524, save project icon 526, import recording 528, create title clip 530, product highlight video 532, clear storyboard 534, and manager help 536. To open a new project, selecting the new project icon 522 will also automatically permit a project to be entered and opened. To open an existing project, selecting open project icon 524 will automatically permit an existing project to be entered and opened. To import a recording into the currently opened project, selecting import recording 528 will automatically permit a recording to be imported into the opened project within the presenter project pane 482. Once the new project is opened, continue with Step 128.

Figure 22:
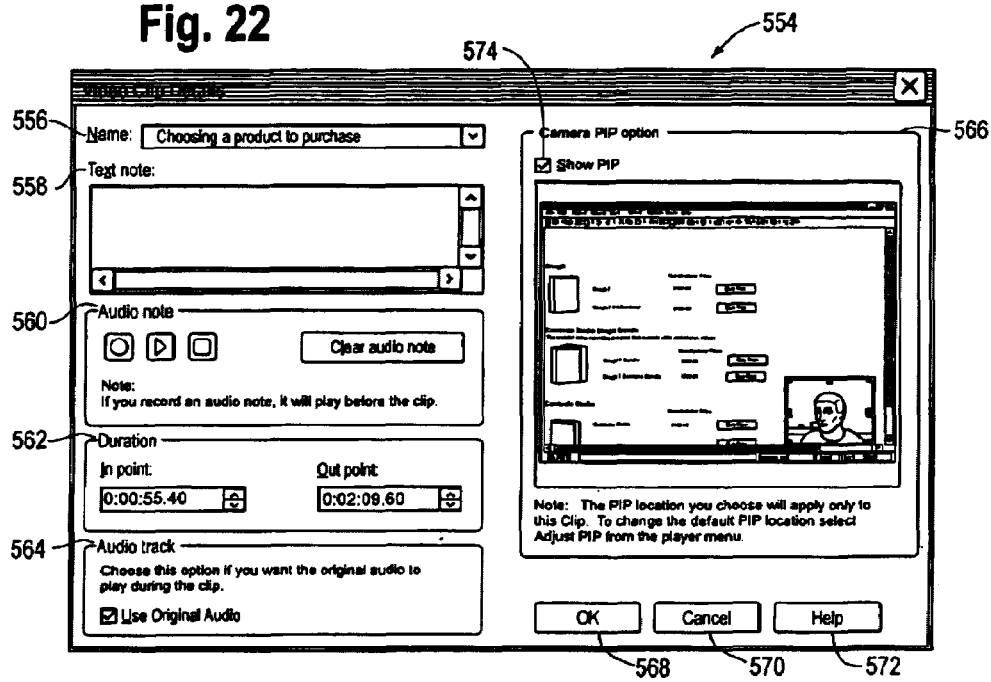
FIG. 22 is a diagram of the video clip details from the presenter clip heading drop down menu from the menu bar of the Presenter tab of the Manager interface screen.

Continuing with Step 128, a series of video and title clips are created from the segments or recordings opened in the presenter project pane 482. Video clips can be created using the Menu Bar 478. Using the Menu Bar 478, the Clip heading 492 is selected which displays the presenter clip heading drop down menu 538, as illustrated in FIG. 21. The presenter clip heading drop down menu 538 provides selections of create video clip 540, create title clip 542, clip bin 544, thumbnail size 546, empty clip bin 548, storyboard 550, and clear storyboard 552. Selecting the create video clip 540 displays a video clip details dialog box 554, as illustrated in FIG. 22. The video clip details dialog box 554 consists of a name 556, a text note 558, an audio note 560, a duration 562, an audio track 564, a camera pip options 566, an ok button 568, a cancel button 570, and a help button 572. This process may also be designated by the nomenclature of "Clip >Create Video Clip". The "Clip" refers to the clip heading 492 and the "Create Video Clip" refers to the create video clip 540.

To create a video clip using the video clip details dialog box 554, a name is entered in the name 556. The text note 558, the audio note 560, and the duration 562 are entered and used in the same manner as described above for markers and segments. For each video clip that has a corresponding camera video, this camera video can be displayed as a picture-in-picture (PIP) image over the screen video by placing a checkmark in the show PIP box 574. The PIP image can also be moved around, resized, and the opacity can be adjusted as part of the edit clip 598 discussed in further detail below. When the settings are entered, select the ok button 568 to create the video clip. Once created the video clip will appear in the clip bin 484. If the settings are not accurate, select the cancel button 570 to exit from the video clip details dialog box 554.

Figure 23:
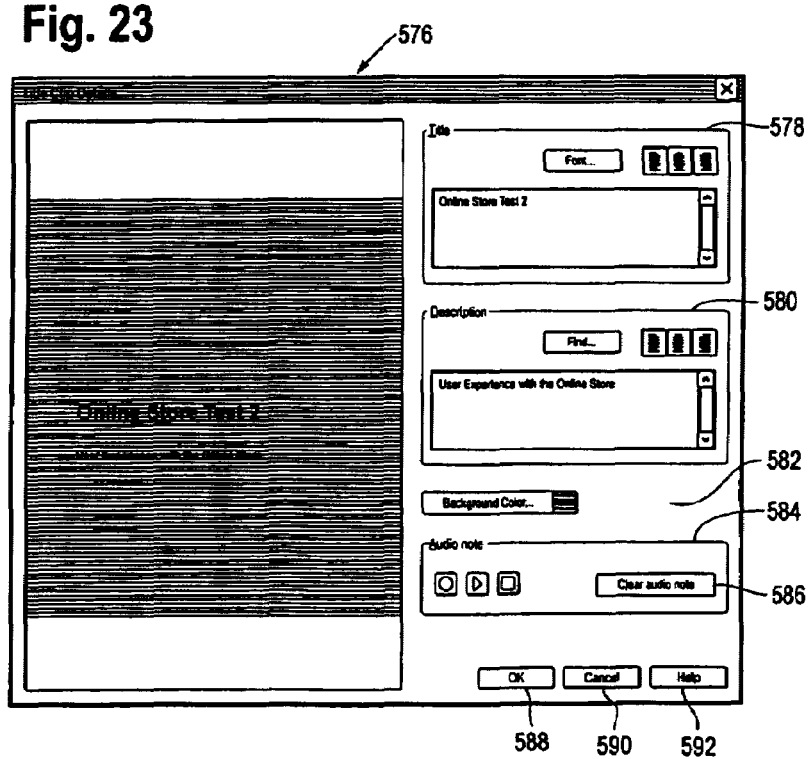
FIG. 23 is a diagram of the title clip details from the presenter clip heading drop down menu from the menu bar of the Presenter tab of the Manager interface screen.

Title clips can be created using either the Menu Bar 478 or Toolbar 480. Using the Menu Bar 478, the Clip heading 492 is selected which displays the presenter clip heading drop down menu 538, as illustrated in FIG. 21. Selecting the create title clip 542 displays a title clip details dialog box 576, as illustrated in FIG. 23. The title clip details dialog box 576 consists of a title 578, a description 580, a background color 582, a audio note 584, a clear audio note 586, an ok button 588, a cancel button 590, and a help button 592. This process may also be designated by the nomenclature of "Clip >Create Title Clip". The "Clip" refers to the clip heading 492 and the "Create Title Clip" refers to the create title clip 542.

To create a title clip using the title clip details dialog box 576, a title is entered in the title 578 and a description, which will appear underneath the title 578 is entered in the description 580. The audio note 584 is entered and used in the same manner as described above. When the settings are entered, select the ok button 588 to create the title clip. Once created the title clip will appear in the clip bin 484. If the settings are not accurate, select the cancel button 590 to exit from the title clip details dialog box 576. Alternatively, the title clip can be created using the Toolbar 480. Selecting the create title clip 530 will also automatically display the title clip dialog box 576 to create the title clip. When completed, proceed to Step 129 of FIG. 3.

In Step 129, the video clips and/or the title clips can be edited. The clips can be edited using the Menu Bar 478. Using the Menu Bar 478, the Clip heading 492 is selected which displays the presenter clip heading drop down menu 538, as illustrated in FIG. 21. Selecting the clip bin 544 displays a clip bin details dialog box menu 594. The clip bin details dialog box menu 594 consists of a play clip 596, edit clip 598, add clips to storyboard 600, and delete clips 602. Selecting edit clip 598 redisplays the video clip details dialog box 554 or the title clip details dialog box 576, depending upon which clip is selected, such that any changes to the clip can be made, as desired. This process may also be designated by the nomenclature of "Clip >Clip Bin >Edit Clip". The "Clip" refers to the clip heading 492, the "Clip Bin" refers to the clip bin 544, and the Edit Clip refers to the edit clip 598.

Once the video clips and title clips are created, the desired clips are added to the storyboard 488. The clips can be added to the storyboard 488 using either the Menu Bar 478 or the clip bin 484. Using the Menu Bar 478, the Clip heading 492 is selected which displays the presenter clip heading drop down menu 538, as illustrated in FIG. 21. Selecting the clip bin 544 displays the clip bin drop down menu 594. Selecting add clip to storyboard 600 inserts the selected video or title clip into the storyboard 488. These steps are repeated until all the desired video clips and title clips are in the storyboard 488. This process may also be designated by the nomenclature of "Clip >Clip Bin >Add Clips". The "Clip" refers to the clip heading 492, the "Clip Bin" refers to the clip bin 544, and the Add Clips refers to the add clips to storyboard 600. Alternatively, any video clip or title clip in the clip bin 484 can be selected and dragged into the storyboard 488. All the video clips and title clips are then arranged in the desired order of preference to present the highlight video.

If a video clip or title clip that has been added to the storyboard 488 and is no longer desired to be in the storyboard 488, the video clip or title clip can be removed using the Menu Bar 478. Using the Menu Bar 478, the Clip heading 492 is selected which displays the presenter clip heading drop down menu 538, as illustrated in FIG. 21. Selecting the storyboard 550 displays the storyboard drop down menu 604. The storyboard drop down menu 604 consists of a play clip 606, an edit clip 608, and a remove clip from storyboard 610. Selecting remove clip from storyboard 610 deletes the selected video or title clip from the storyboard 488. This step is repeated for any other video clip and/or title clip that is desired to be removed from the storyboard 488. This process may also be designated by the nomenclature of "Clip >Storyboard >Remove Clip". The "Clip" refers to the clip heading 492, the "Storyboard" refers to the storyboard 550, and the Remove Clip refers to the remove clip from storyboard 610. Alternatively, any video clip or title clip in the storyboard 488 can be selected and deleted, using the keyboard keys, from the storyboard 488. Upon completion of the storyboard 488, proceed to Step 130.

In Step 130, the highlight video of the series of video and title clips in the storyboard 488 is created. The highlight video can be created using either the Menu Bar 478 or Toolbar 480. Using the Menu Bar 478, the File heading 490 is selected which displays the presenter file heading drop down menu 500, as illustrated in FIG. 21. Selecting the produce highlight video 512 permits the highlight video to be rendered or created according to desired colors, frame rate, audio codec (or format), video codec, and video size. This process may also be designated by the nomenclature of "File >Produce Highlight Video". The "File" refers to the File heading 490, the "Produce Highlight Video" refers to the produce highlight video 512. Alternatively, the highlight video can be created using the Toolbar 480. Selecting the produce highlight video 532 will also automatically permit the highlight video to be rendered or created according to desired colors, frame rate, audio codec (or format), video codec, and video size. When completed, proceed to Step 131 and exit Presenter 270. Then, proceed to Player 612 and Step 132 of FIG. 3.

Referring to Step 132, the Player begins. This program enables the user to load and play the highlight video created in the Presenter 270.

Figure 25:
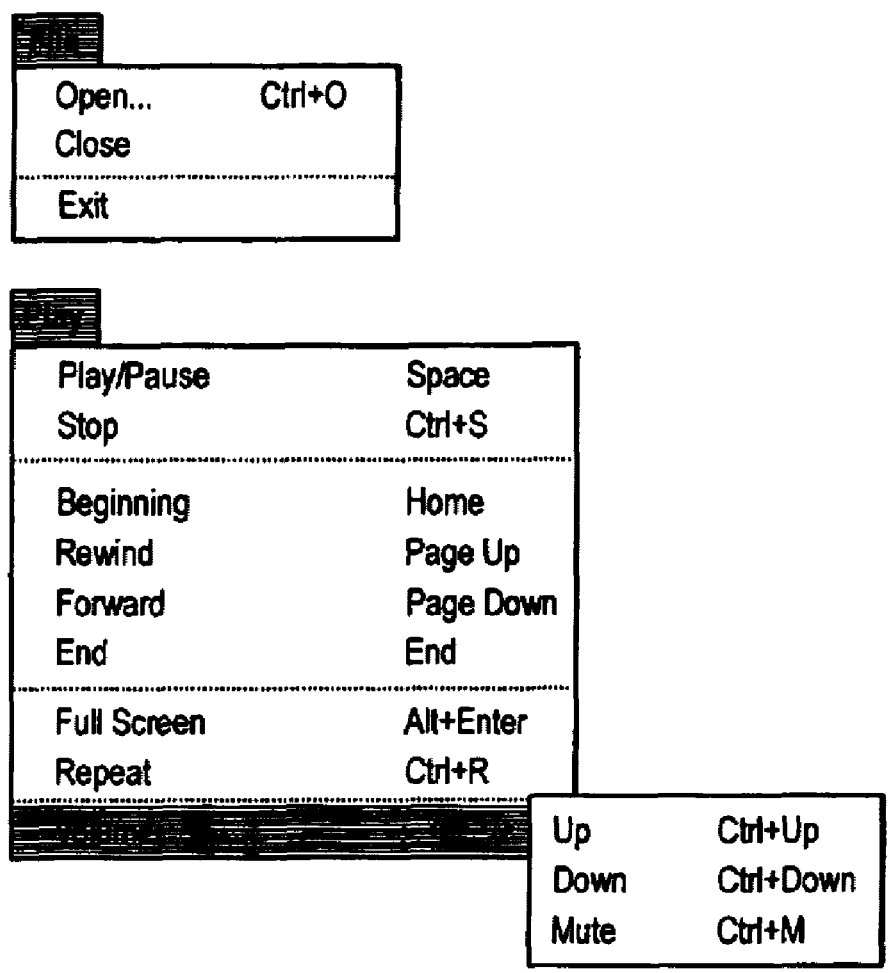
FIG. 25 is a diagram of the drop down menus from the Player interface screen.

In Step 133, the Player, as illustrated in FIG. 25, permits the selection of the desired highlight video to open and play and provides playback controls such as play/pause, stop, beginning, rewind, forward, end, full screen, repeat, and volume.

Thus, there has been provided a unique automated system and method for conducting usability testing. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the invention.

What is claimed is:

1. A computer based method for recording computer activity, comprising the steps of:
   (a) starting a recording on a recorder computer using a plurality of selected recording settings, the recorder computer providing a screen to display the recording;
   (b) capturing a plurality of input streams from different input devices during the recording for creating a plurality of captured input streams;
   (c) synchronizing the plurality of input streams;
   (d) stopping the recording at a predetermined time; and
   (e) saving a recording file of the plurality of captured input streams.

2. The method according to claim 1 and further comprising the step of configuring a plurality of recording settings for creating the plurality of selected recording settings.

3. The method according to claim 1 wherein one of the plurality of input streams from different input devices comprises a video of the screen of the recorder computer.

4. The method according to claim 1 wherein one of the plurality of input streams from different input devices comprises a plurality of text displayed on the screen of the recorder computer from a keyboard attached to the recorder computer.

5. The method according to claim 1 wherein one of the plurality of input streams from different input devices comprises a plurality of text information displayed on the screen of the recorder computer.

6. The method according to claim 1 wherein one of the plurality of input streams from different input devices comprises a plurality of mouse clicks displayed on the screen of the recorder computer from a mouse attached to the recorder computer.

7. The method according to claim 1 wherein one of the plurality of input streams from different input devices comprises a plurality of system events occurring on the recorder computer.

8. The method according to claim 1 wherein one of the plurality of input streams from different input devices comprises a video of the user operating the recorder computer from a camera attached to the recorder computer.

9. The method according to claim 1 wherein one of the plurality of input streams from different input devices comprises an audio of the user operating the recorder computer from a microphone attached to the recorder computer.

10. A computer based method for recording computer activity, comprising the steps of:
    (a) starting a recording on a recorder computer using a plurality of selected recording settings, the recorder computer providing a screen to display the recording;
    (b) connecting the recorder computer to a remote computer;
    (c) capturing a plurality of input streams from different input devices during the recording for creating a plurality of captured input streams;
    (d) adding a plurality of information to the recording from the remote computer for creating a plurality of added information;
    (e) stopping the recording at a predetermined time; and
    (f) saving a recording file of the plurality of captured input streams and the plurality of added information.

11. The method according to claim 10 and further comprising the step of configuring a plurality of recording settings for creating the plurality of selected recording settings.

12. The method according to claim 11 and further comprising the step of testing the plurality of selected recording settings.

13. The method according to claim 10 wherein one of the plurality of input streams from different input devices comprises a video of the screen of the recorder computer.

14. The method according to claim 10 wherein one of the plurality of input streams from different input devices comprises a plurality of text information displayed on the screen of the recorder computer from a keyboard attached to the recorder computer.

15. The method according to claim 10 wherein one of the plurality of input streams from different input devices comprises a plurality of text information displayed on the screen of the recorder computer.

16. The method according to claim 10 wherein one of the plurality of input streams from different input devices comprises a plurality of mouse clicks displayed on the screen of the recorder computer from a mouse attached to the recorder computer.

17. The method according to claim 10 wherein one of the plurality of input streams from different input devices comprises a plurality of system events occurring on the recorder computer.

18. The method according to claim 10 wherein one of the plurality of input streams from different input devices comprises a video of the user operating the recorder computer from a camera attached to the recorder computer.

19. The method according to claim 10 wherein one of the plurality of input streams from different input devices comprises an audio of the user operating the recorder computer from a microphone attached to the recorder computer.

20. A computer based method for conducting and analyzing a usability test, comprising the steps of
    (a) starting the usability test on a recorder computer using a plurality of selected recording settings, the recorder computer providing a screen to display the usability test;
    (b) capturing a plurality of input streams during the usability test for creating a plurality of captured input streams from different input devices;
    (c) synchronizing the plurality of input streams;
    (d) stopping the usability test at a predetermined time; and
    (e) saving a recording file of the plurality of captured input streams.

21. The method according to claim 20 and further comprising the step of configuring a plurality of recording settings for creating the plurality of selected recording settings.

22. The method according to claim 20 wherein one of the plurality of input streams from different input devices comprises a video of the screen of the recorder computer.

23. The method according to claim 20 wherein one of the plurality of input streams comprises a plurality of text information displayed on the screen of the recorder computer from a keyboard attached to the recorder computer.

24. The method according to claim 20 wherein one of the plurality of input streams comprises a plurality of text information displayed on the screen of the recorder computer from the usability test.

25. The method according to claim 20 wherein one of the plurality of input streams comprises a plurality of mouse clicks displayed on the screen of the recorder computer from a mouse attached to the recorder computer.

26. The method according to claim 20 wherein one of the plurality of input streams comprises a plurality of system events occurring on the recorder computer from the usability test.

27. The method according to claim 20 wherein one of the plurality of input streams comprises a video of the user operating the recorder computer from a camera attached to the recorder computer.

28. The method according to claim 20 wherein one of the plurality of input streams comprises an audio of the user operating the recorder computer from a microphone attached to the recorder computer.

29. The method according to claim 20 and further comprising the step of connecting the recorder computer to a remote computer.

30. The method according to claim 29 and further comprising the step of adding a plurality of markers to the usability test from the remote computer for creating a plurality of added markers.

31. The method according to claim 30 and further comprising the step of disconnecting the remote computer from the recorder computer.

32. The method according to claim 31 and further comprising the step of saving the recording file with the plurality of added markers.

33. A computer based method for conducting and analyzing a usability test, comprising the steps of:
  (a) configuring a plurality of recording settings for creating a selected recording settings, the plurality of selected recording settings comprising a plurality of input streams from different input devices;
  (b) testing the selected recording settings;
  (c) starting the usability test on a recorder computer using the plurality of selected recording settings, the recorder computer providing a screen to display the usability test;
  (d) connecting the recorder computer to a remote computer;
  (e) capturing the plurality of input streams during the usability test for creating a plurality of captured input streams;
  (f) adding a first set of plurality of markers to the usability test from the remote computer for creating a plurality of added markers;
  (g) stopping the usability test at a predetermined time;
  (h) disconnecting the remote computer from the recorder computer;
  (i) saving a recording file of the plurality of captured input streams and the plurality of added markers;
  (j) opening a project;
  (k) importing a plurality of recording files into the opened project;
  (l) analyzing the plurality of recording files for isolating a set of analyzed information;
  (m) creating a highlight video of the analyzed information; and
  (n) playing the highlight video.

34. The method according to claim 33 wherein one of the plurality of input streams from different input devices comprises a video of the screen of the recorder computer.

35. The method according to claim 33 wherein one of the plurality of input streams from different input devices comprises a plurality of text information displayed on the screen of the recorder computer from a keyboard attached to the recorder computer.

36. The method according to claim 33 wherein one of the plurality of input streams from different input devices comprises a plurality of text information displayed on the screen of the recorder computer from the usability test.

37. The method according to claim 33 wherein one of the plurality of input streams from different input devices comprises a plurality of mouse clicks displayed on the screen of the recorder computer from a mouse attached to the recorder computer.

38. The method according to claim 33 wherein one of the plurality of input streams from different input devices comprises a plurality of system events occurring on the recorder computer from the usability test.

39. The method according to claim 33 wherein one of the plurality of input streams from different input devices comprises a video of the user operating the recorder computer from a camera attached to the recorder computer.

40. The method according to claim 33 wherein one of the plurality of input streams from different input devices comprises an audio of the user operating the recorder computer from a microphone attached to the recorder computer.

41. The method according to claim 33 wherein testing the selected recording settings further comprises the step of starting a practice usability test using the selected recording settings.

42. The method according to claim 33 wherein testing the selected recording settings further comprises the step of capturing a plurality of practice input streams during the practice usability test.

43. The method according to claim 33 wherein testing the selected recording settings further comprises the step of correcting any problems encountered during the practice usability test.

44. The method according to claim 33 wherein testing the selected recording settings further comprises the step of stopping the practice usability test after a specified duration.

45. The method according to claim 33 wherein analyzing the plurality of recording files further comprises the step of searching the plurality of recording files for information contained within the plurality of captured input streams.

46. The method according to claim 33 wherein analyzing the plurality of recording files further comprises the step of creating a second set of plurality of markers into the project from the plurality of captured input streams searched.

47. The method according to claim 33 wherein analyzing the plurality of recording files further comprises the step of creating a first set of plurality of segments into the project from the plurality of captured input streams searched.

48. The method according to claim 33 and further comprising the step of creating a plurality of video clips from the set of analyzed information.

49. The method according to claim 33 and further comprising the step of creating a storyboard from the plurality of video clips.

50. The method according to claim 33 and further comprising the step of creating a plurality of title clips for the plurality of video clips.

51. The method according to claim 33 and further comprising the step of creating the highlight video from the storyboard.

52. A computer based method for conducting and analyzing a usability test, comprising the steps of:
  if the recording settings are to be configured, then performing the following step (a):
    (a) configuring a plurality of recording settings for creating a selected recording settings, the plurality of selected recording settings comprising a plurality of input streams from different input devices;

if the recording settings are not to be configured, then performing the following step (b):
  (b) importing a plurality of previously recorded recording settings for creating a selected recording settings, the plurality of selected recording settings comprising a plurality of input streams from different input devices;
if the plurality of selected recording settings are to be tested, then performing the following step (c):
  (c) testing the selected recording settings;
starting the usability test on a recorder computer using the plurality of selected recording settings, the recorder computer providing a screen to display the usability test;
if the recorder computer is to be connected to a remote computer, then performing the following steps (d)–(e):
  (d) connecting the recorder computer to a remote computer;
  (e) adding a first set of plurality of markers during the usability test from the remote computer for creating a plurality of added markers;
capturing the plurality of input streams during the usability test for creating a plurality of captured input streams;
synchronizing the plurality of input streams;
stopping the usability test at a predetermined time;
if the recorder computer is connected, then performing the following step (f):
  (f) disconnecting the remote computer from the recorder computer;
saving a recording file of the plurality of captured input streams and the plurality of added markers;
if the usability test is to be analyzed, then performing the following steps (g)–(k):
  (g) opening a project;
  (h) importing a plurality of recording files into the opened project;
  (i) analyzing the plurality of recording files for isolating a set of analyzed information,
  (j) creating a highlight video of the analyzed information; and
  (k) playing the highlight video.

53. The method according to claim 52 wherein one of the plurality of input streams from different input devices comprises a video of the screen of the recorder computer.

54. The method according to claim 52 wherein one of the plurality of input streams from different input devices comprises a plurality of text information displayed on the screen of the recorder computer from a keyboard attached to the recorder computer.

55. The method according to claim 52 wherein one of the plurality of input streams from different input devices comprises a plurality of text information displayed on the screen of the recorder computer from the usability test.

56. The method according to claim 52 wherein one of the plurality of input streams from different input devices comprises a plurality of mouse clicks displayed on the screen of the recorder computer from a mouse attached to the recorder computer.

57. The method according to claim 52 wherein one of the plurality of input streams from different input devices comprises a plurality of system events occurring on the recorder computer from the usability test.

58. The method according to claim 52 wherein one of the plurality of input streams from different input devices comprises a video of the user operating the recorder computer from a camera attached to the recorder computer.

59. The method according to claim 52 wherein one of the plurality of input streams from different input devices comprises an audio of the user operating the recorder computer from a microphone attached to the recorder computer.

60. The method according to claim 52 wherein, if testing the selected recording settings is selected, then performing the following steps (l)–(o):
  (l) starting a practice usability test using the selected recording settings;
  (m) capturing a plurality of practice input streams during the practice usability test;
  (n) correcting any problems encountered during the practice usability test;
  (o) stopping the practice usability test after a specified duration.

61. The method according to claim 52 wherein, if the usability test is to be analyzed, then performing the following steps (p)–(r):
  (p) searching the plurality of recording files for information contained within the plurality of captured input streams;
  (q) creating a second set of plurality of markers into the project from the plurality of captured input streams searched;
  (r) creating a first set of plurality of segments into the project from the plurality of captured input streams searched.

62. The method according to claim 52 and further comprising the step of creating a plurality of video clips from the set of analyzed information.

63. The method according to claim 52 and further comprising the step of creating a storyboard from the plurality of video clips.

64. The method according to claim 52 and further comprising the step of creating a plurality of title clips for the plurality of video clips.

65. The method according to claim 52 and further comprising the step of creating the highlight video from the storyboard.

66. A computer program product comprising a computer storage medium having a computer program code mechanism embedded in the computer storage medium for use with a receiving medium for recording computer activity, the computer program code mechanism comprising:
  a first computer code device configured to start a recording on a recorder computer using a plurality of selected recording settings, the recorder computer providing a screen to display the recording;
  a second computer code device configured to capture a video of the screen of the recorder computer;
  a third computer code device configured to capture a video of the user operating the recorder computer;
  a fourth computer code device configured to capture a plurality of input streams during the recording for creating a plurality of captured input streams;
  a fifth computer code device configured to stop the recording at a predetermined time; and
  a sixth computer code device configured to save a recording file of the video of the screen of the recorder computer, the video of the user operating the recorder computer, and the plurality of captured input streams.

67. The computer program according to claim 66 wherein one of the plurality of captured input streams comprises a plurality of text information displayed on the screen of the recorder computer from a keyboard attached to the recorder computer.

68. The computer program according to claim 66 wherein one of the plurality of input streams comprises a plurality of text information displayed on the screen of the recorder computer from the recording.

69. The computer program according to claim 66 wherein one of the plurality of input streams comprises a plurality of mouse clicks displayed on the screen of the recorder computer from a mouse attached to the recorder computer.

70. The computer program according to claim 66 wherein one of the plurality of input streams comprises a plurality of system events occurring on the recorder computer from the recording.

71. The computer program according to claim 66 wherein one of the plurality of input streams comprises an audio of the user operating the recorder computer from a microphone attached to the recorder computer.

* * * * *